us011108208B2

(12) United States Patent
Oda et al.

(10) Patent No.: US 11,108,208 B2
(45) Date of Patent: Aug. 31, 2021

(54) OPTICAL AMPLIFICATION SYSTEM AND OPTICAL AMPLIFICATION METHOD

(71) Applicant: NIPPON TELEGRAPH AND TELEPHONE CORPORATION, Tokyo (JP)

(72) Inventors: Takuya Oda, Yokosuka (JP); Tetsuro Inui, Yokosuka (JP); Akira Hirano, Yokosuka (JP); Wataru Imajuku, Yokosuka (JP); Shoukei Kobayashi, Yokosuka (JP); Takafumi Tanaka, Yokosuka (JP); Yutaka Miyamoto, Yokosuka (JP); Hidehiko Takara, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 510 days.

(21) Appl. No.: 15/778,541

(22) PCT Filed: Nov. 22, 2016

(86) PCT No.: PCT/JP2016/084581
§ 371 (c)(1),
(2) Date: May 23, 2018

(87) PCT Pub. No.: WO2017/090598
PCT Pub. Date: Jun. 1, 2017

(65) Prior Publication Data
US 2018/0358773 A1 Dec. 13, 2018

(30) Foreign Application Priority Data
Nov. 26, 2015 (JP) .............................. JP2015-230877

(51) Int. Cl.
*H01S 3/067* (2006.01)
*H04B 10/291* (2013.01)
(Continued)

(52) U.S. Cl.
CPC ............ *H01S 3/06737* (2013.01); *G02F 1/35* (2013.01); *H01S 3/06754* (2013.01);
(Continued)

(58) Field of Classification Search
CPC ............ H01S 3/06737; H01S 3/06754; H04B 10/2581; H04B 10/291
See application file for complete search history.

(56) References Cited

U.S. PATENT DOCUMENTS 9,225,141 B2 * 12/2015 Tsuchida ............. H01S 3/06737
9,523,787 B2 * 12/2016 Jaaskelainen ....... H01S 3/06733
(Continued)

FOREIGN PATENT DOCUMENTS

| CN | 101876774 A | 11/2010 |
| CN | 103261934 A | 8/2013 |

(Continued)

OTHER PUBLICATIONS

Shinji Matsuoka, Ultrahigh-speed Ultrahigh-capacity Transport Network Technology for Cost-effective Core and Metro Networks, NTT Technical Journal, Mar. 2011, p. 8-12.
(Continued)

*Primary Examiner* — Eric L Bolda
(74) *Attorney, Agent, or Firm* — Harness, Dickey & Pierce, P.L.C.

(57) ABSTRACT

An optical amplification system includes: three or more nodes; a multi-core fiber having a plurality of cores, the multi-core fiber being used in at least a partial segment of the connection between the nodes; an amplification light input unit configured to input amplification light to a core of the
(Continued)

plurality of cores of the multi-core fiber; an amplification unit configured to amplify communication light transmitted through at least one core of the plurality of cores of the multi-core fiber using the amplification light, the amplification unit being provided in the nodes or between the nodes; and an amplification light coupling unit configured to couple the amplification light input by the amplification light input unit to the amplification unit.

8 Claims, 21 Drawing Sheets

(51) Int. Cl.
    *H01S 3/16*     (2006.01)
    *H04B 10/2581*     (2013.01)
    *H01S 3/094*     (2006.01)
    *G02F 1/35*     (2006.01)
    *H01S 3/30*     (2006.01)

(52) U.S. Cl.
    CPC ....... *H01S 3/1608* (2013.01); *H04B 10/2581* (2013.01); *H04B 10/291* (2013.01); *H01S 3/06704* (2013.01); *H01S 3/094003* (2013.01); *H01S 3/302* (2013.01)

(56) References Cited

U.S. PATENT DOCUMENTS

| | | | |
|---|---|---|---|
| 2013/0063809 A1* | 3/2013 | Nishihara | H01S 3/06737 359/341.2 |
| 2013/0121693 A1 | 5/2013 | Tanaka et al. | |
| 2018/0102626 A1* | 4/2018 | Ip | H01S 3/094019 |

FOREIGN PATENT DOCUMENTS

| | | |
|---|---|---|
| CN | 104583823 A | 4/2015 |
| EP | 2725729 A1 | 4/2014 |
| JP | 5117636 B1 | 1/2013 |
| JP | 2013-058651 A | 3/2013 |
| JP | 2013-106272 A | 5/2013 |
| JP | 2013-522914 A | 6/2013 |
| JP | 2014-236210 A | 12/2014 |
| JP | 5659341 B2 | 1/2015 |
| JP | 2015-510253 A | 4/2015 |
| WO | WO-2011/116075 A1 | 9/2011 |
| WO | WO-2013/021697 A1 | 2/2013 |
| WO | WO-2013/090549 A2 | 6/2013 |

OTHER PUBLICATIONS

Yutaka Miyamoto and Hirokazu Takenouchi, Dense Space-division-multiplexing Optical Communications Technology for Petabit-per-second Class Transmission, NTT Technical Journal, Aug. 2014, p. 52-56, with English version published Dec. 2014.

Kazuyuki Shiraki, R&D Trends in Optical Fiber and Cable Technology, NTTechnical Journal, Jan. 2015, p. 59-63, with English version published Mar. 2015.

R. R. Thomson, et al, "Ultrafast-laser inscription of a three dimensional fan-out device for multicore fiber coupling applications", Optics Express, OSA Publishing, Sep. 3, 2007, vol. 15, No. 18, p. 11691-11697.

W. Klaus, et al, "Free-Space Coupling Optics for Multicore Fibers", PhotonicsTechnology Letters. IEEE, Nov. 1, 2012, vol. 24, No. 21, p. 1902-1905.

Suzuki, Kenya et al., Pump Light Source for Distributed Raman Amplification in MCFs With LD Sharing Circuit, IEEE Photonics Technology Letters, Nov. 1, 2012. vol. 24, No. 21, pp. 1937 to 1940.

International Search Report for PCT/JP2016/084581, ISA/JP, Tokyo, dated Dec. 27, 2016, with English translation.

Extended European Search Report regarding EPSN 168685410, dated May 22, 2019.

Igarashi, Koji et al. "Ultra-Long-Haul High-Capacity Super-Nyquist-WDM Transmission Experiment Using Multi-Core Fibers", Journal of Lightwave Technology, IEEE, USA, vol. 33, No. 5, Mar. 1, 2015, pp. 1027-1036.

Takara, Hidehiko et al. "120.7-Tb/s MCF-ROPA Unrepeatered Transmission of PDM-32QAM Channels Over 204 km", Journal of Lightwave Technology, IEEE, USA, vol. 33, No. 7, Apr. 1, 2015, pp. 1473-1478.

Saito, Kotaro et al., "Multi-Core Fiber Based Pluggable Add/Drop Link Using Rotational Connector", 2015 Optical Fiber Communications Conference and Exhibition (OFC), OSA, Mar. 22, 2015, pp. 1-3, XP032784765, DOI: 10.1364/OFC.2015.M2B.2 [retrieved on Jun. 10, 2015].

European Office Action from counterpart EP168685410, dated Jun. 10, 2020.

Japanese Office Action for corresponding Application No. 2017-552653, dated Feb. 5, 2019.

* cited by examiner

OPTICAL AMPLIFICATION SYSTEM AND OPTICAL AMPLIFICATION METHOD

TECHNICAL FIELD

The present invention relates to an optical amplification system and an optical amplification method.

This application is a 371 National Phase of PT/JP2016/084581, filed on Nov. 22, 2016. Priority is claimed on Japanese Patent Application No. 2015-230877, filed Nov. 26, 2015, the content of both applications is incorporated herein by reference.

BACKGROUND ART

A communication network which uses optical fibers is constructed in a core network that connects together metropolises and a metro network that connects together bases in an area. In such a network, a plurality of optical fibers are used in a bundle. Wavelength division multiplexing (WDM) transmission which involves multiplexing a plurality of optical signals having different wavelengths is performed on respective individual optical fibers to realize high-capacity signal transmission (for example, see Non-Patent Literature 1). In order to further increase the transmission capacity, the use of a multi-core fiber (MCF) which is an optical fiber having a plurality of cores instead of an optical fiber (single core fiber: SCF) having one core has been discussed (for example, see Non-Patent Literatures 2 and 3).

CITATION LIST

Non-Patent Literature

Non-Patent Literature 1

Shinji Matsuoka, "Ultrahigh-speed Ultrahigh-capacity Transport Network Technology for Cost-effective Core and Metro Networks", NTT Technical Journal, March 2011, pages 8-12

Non-Patent Literature 2

Yutaka Miyamoto and Hirokazu Takenouchi, "Dense Space-division-multiplexing Optical Communications Technology for Petabit-per-second Class Transmission", NTT Technical Journal, August 2014, pages 52-56

Non-Patent Literature 3

Kazuyuki Shiraki, "R&D Trends in Optical Fiber and Cable Technology", NTT Technical Journal, January 2015, pages 59-63

SUMMARY OF INVENTION

Technical Problem

When the distance between nodes is large, since an optical signal attenuates, it is necessary to amplify the optical signal in the course of transmission.

In view of the above-described problems, an object of the present invention is to provide an optical amplification system and an optical amplification method capable of amplifying an optical signal transmitted through a multi-core fiber.

Solution to Problem

An optical amplification system of a first aspect of the present invention is an optical amplification system which includes: three or more nodes; a multi-core fiber having a plurality of cores, the multi-core fiber being used in at least a partial segment of the connection between the nodes; an amplification light input unit configured to input amplification light to a core of the plurality of cores of the multi-core fiber; an amplification unit configured to amplify communication light transmitted through at least one core of the plurality of cores of the multi-core fiber using the amplification light, the amplification unit being provided in the nodes or between the nodes; and an amplification light coupling unit configured to couple the amplification light input by the amplification light input unit to the amplification unit.

According to a second aspect of the present invention, in the optical amplification system of the first aspect, the amplification unit includes the at least one core transmitting the communication light among the plurality of cores of the multi-core fiber.

According to a third aspect of the present invention, in the optical amplification system of the second aspect, the amplification unit includes the at least one core transmitting the communication light among the plurality of cores of the multi-core fiber, and the at least one core is configured to perform Raman amplification.

According to a fourth aspect of the present invention, in the optical amplification system of the first aspect, the amplification unit includes a multi-core fiber amplifier doped with a rare earth element.

According to a fifth aspect of the present invention, in the optical amplification system of the fourth aspect, the amplification unit includes an erbium-doped multi-core fiber amplifier.

According to a sixth aspect of the present invention, in the optical amplification system of the first aspect, the amplification unit provided in one of the nodes amplifies the communication light using the amplification light which is generated in anther node of the nodes and is transmitted through one of the plurality of cores of the multi-core fiber.

According to a seventh aspect of the present invention, in the optical amplification system of the sixth aspect, the one of the plurality of cores of the multi-core fiber transmitting the amplification light is different from the at least one core of the plurality of cores of the multi-core fiber transmitting the communication light.

According to an eighth aspect of the present invention, in the optical amplification system of the sixth aspect, the one of the plurality of cores of the multi-core fiber transmitting the amplification light is the same as the at least one core of the plurality of cores of the multi-core fiber transmitting the communication light.

An optical amplification method according to a ninth aspect of the present invention is an optical amplification method executed by an optical amplification system which includes three or more nodes and a multi-core fiber having a plurality of cores, the multi-core fiber being used in at least a partial segment of the connection between the nodes. The optical amplification method including: an amplified light input step of inputting, by an amplification light input unit, amplification light to a core of the multi-core fiber; an amplification light coupling step of coupling, by an amplification light coupling unit, the amplification light input in the amplification light input step to an amplification unit provided in the nodes or between the nodes; and an amplification step of amplifying, by the amplification unit, a communication light transmitted through at least one of the plurality of cores of the multi-core fiber using the amplification light.

Advantageous Effects of Invention

According to the present invention, it is possible to amplify an optical signal transmitted through a multi-core fiber.

DESCRIPTION OF EMBODIMENTS

Figure 1:
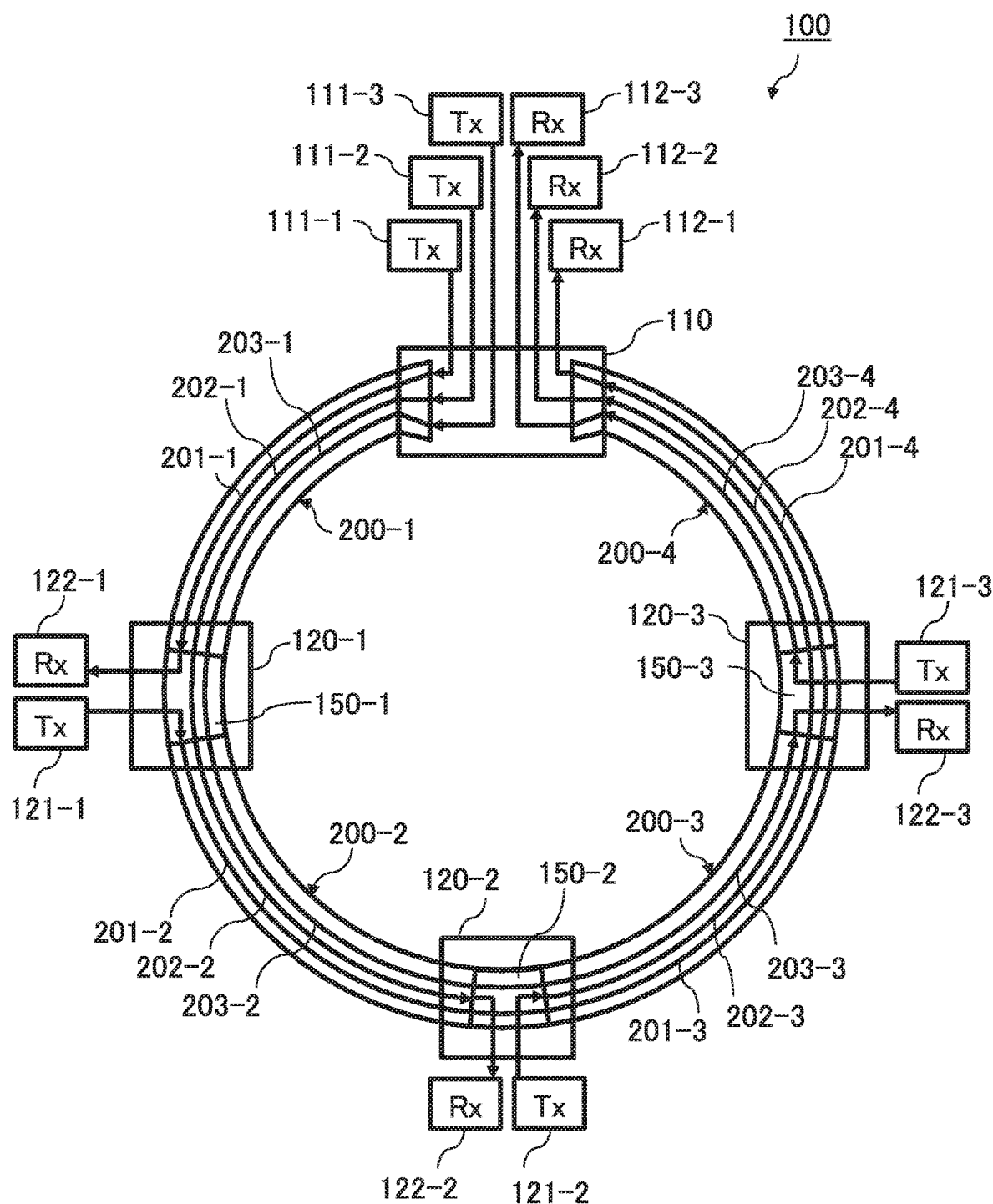
FIG. 1 is a diagram showing a first configuration example of a communication system to which an embodiment of the present invention can be applied.

Hereinafter, an embodiment of the present invention will be described with reference to the drawings. In the following embodiments, elements denoted by the same reference numerals perform similar operations and a redundant description thereof will be omitted appropriately.

First, a communication system to which an embodiment of the present invention can be applied will be described.

FIG. 1 is a diagram showing a configuration example of a communication system 100 to which an embodiment of the present invention can be applied. The communication system 100 includes a transceiving node 110 and n Add/Drop nodes 120, n being an integer of 1 or more. FIG. 1 shows a configuration example of the communication system 100 when n=3. In the following description, the respective n Add/Drop nodes 120 will be referred to as Add/Drop nodes 120-1 to 120-n. Moreover, the transceiving node 110 and the Add/Drop node 120 will be collectively referred to as a "node." In the following description, a transmitting device, a receiving device, a transceiving device, and the like that perform communication using optical signals and nodes will be described as individual configurations. However, a node may include a transmitting device, a receiving device, a transceiving device, and the like.

Nodes are connected together by multi-core fibers (MCFs) 200-1 to 200-4. The communication system 100 has a physical topology of a single-system one-way ring configuration in which the nodes are connected together by the MCFs 200-1 to 200-4. The transceiving node 110 and the Add/Drop node 120-1 are connected together by the MCF 200-1. The Add/Drop node 120-1 and the Add/Drop node 120-2 are connected together by the MCF 200-2. The Add/Drop node 120-2 and the Add/Drop node 120-3 are connected together by the MCF 200-3. The Add/Drop node 120-3 and the transceiving node 110 are connected together by the MCF 200-4. Each of the MCFs 200-1 to 200-4 of the communication system 100 has three cores 201, 202, and 203.

When the description of the configuration of the communication system 100 is generalized, an Add/Drop node 120-i (1≤i≤n−1) is connected to an Add/Drop node 120-(i+1) by an MCF 200-(i+1). The MCF 200-1 connects together the transceiving node 110 and the Add/Drop node 120-1. The MCF 200-(n+1) connects together the Add/Drop node 120-n and the transceiving node 110.

Each node of the communication system 100 includes a transmitting device (Tx) and a receiving device (Rx) that perform communication between the nodes. Transmitting devices 111-1 to 111-3 and receiving devices 112-1 to 112-3 are provided in the transceiving node 110. A transmitting device 121-1 and a receiving device 122-1 are provided in the Add/Drop node 120-1. A transmitting device 121-2 and a receiving device 122-2 are provided in the Add/Drop node 120-2. A transmitting device 121-3 and a receiving device 122-3 are provided in the Add/Drop node 120-3. The transmitting devices 111-1 to 111-3 generate optical signals to be transmitted to the Add/Drop nodes 120-1 to 120-3, respectively. The receiving devices 112-1 to 112-3 receive optical signals transmitted from the Add/Drop nodes 120-1 to 120-3 and acquire information included in the optical signals. The transmitting devices 121-1 to 121-3 generate optical signals to be transmitted to the transceiving node 110. The receiving devices 122-1 to 122-3 receive optical signals transmitted from the transceiving node 110 and acquire information included in the optical signals.

The transmitting devices 111-1 to 111-3 generate optical signals addressed to the Add/Drop nodes 120-1 to 120-3, respectively. The three optical signals generated by the transmitting devices 111-1 to 111-3 are added to the cores 201-1 to 203-1 of the MCF 200-1, respectively. The receiving devices 112-1 to 112-3 receive optical signals transmitted from the Add/Drop nodes 120-1, 120-2, and 120-3 to nodes included in the receiving devices, respectively. The receiving devices 112-1 to 112-3 receive optical signals from the Add/Drop nodes 120-1 to 120-3 via the cores 201-4 to 203-4 of the MCF 200-4. A fan-in device or a fan-out device is used for adding optical signals to the MCF 200 and dropping optical signals from the MCF 200 in the transceiving node 110.

The fan-in device is a device which is connected to each of the cores in a multi-core fiber and which adds optical signals to the cores. The fan-out device is a device which is connected to each of the cores in a multi-core fiber and which drops each of optical signals propagating through the cores. Since the only difference between the devices is that the propagating directions of optical signals are different, input and output of optical signals to and from a multi-core fiber may be performed using any one of the fan-in device and the fan-out device. Moreover, adding of optical signals addressed to a multi-core fiber and dropping of optical signals from the multi-core fiber may be performed using one device.

Connectors 150-1 to 150-3 are provided in the Add/Drop nodes 120-1 to 120-3, respectively. A connector 150-$i$ of an Add/Drop node 120-$i$ ($i$=1, 2, 3) is connected to an MCF 200-$i$ and an MCF 200-($i$+1). A connector 150-$i$ drops an optical signal addressed to a subject node among the optical signals added in the transceiving node 110 from the MCF 200-$i$. Moreover, the connector 150-$i$ adds optical signals addressed to the transceiving node 110 to the cores of the MCF 200-($i$+1).

In the Add/Drop node 120-1, the connector 150-1 drops an optical signal addressed to the subject node from the core 201-1 of the MCF 200-1. The connector 150-1 connects the dropped optical signal to the receiving device 122-1. Moreover, the connector 150-1 adds an optical signal generated by the transmitting device 121-1 to the core 201-2 of the MCF 200-2. The optical signal added to the core 201-2 is an optical signals transmitted from the Add/Drop node 120-1 to the transceiving node 110.

The connector 150-1 connects the cores 202-1 and 203-1 among the cores of the MCF 200-1 to the cores 202-2 and 203-2 among the cores of the MCF 200-2. The connector 150-1 relays optical signals between the MCF 200-1 and the MCF 200-2. The connector 150-1 relays optical signals transmitted through cores other than the cores 201-1 and 201-2 that add or drop optical signals.

In the Add/Drop node 120-2, the connector 150-2 drops an optical signal addressed to the subject node from the core 202-2 of the MCF 200-2. The connector 150-2 connects the dropped optical signal to the receiving device 122-2. Moreover, the connector 150-2 adds an optical signal generated by the transmitting device 121-2 to the core 202-3 of the MCF 200-3. The optical signal added to the core 202-3 is an optical signal transmitted from the Add/Drop node 120-2 to the transceiving node 110.

The connector 150-2 connects the cores 201-2 and 203-2 among the cores of the MCF 200-2 to the cores 201-3 and 203-3 among the cores of the MCF 200-3. The connector 150-2 relays optical signals between the MCF 200-2 and the MCF 200-3. The connector 150-2 relays optical signals transmitted through cores other than the cores 201-2 and 201-3 that add or drop optical signals.

In the Add/Drop node 120-3, the connector 150-3 drops an optical signal addressed to the subject node from the core 203-3 of the MCF 200-3. The connector 150-3 connects the dropped optical signal to the receiving device 122-3. Moreover, the connector 150-3 adds an optical signal generated by the transmitting device 121-3 to the core 203-4 of the MCF 200-4. The optical signal added to the core 203-4 is an optical signal transmitted from the Add/Drop node 120-3 to the transceiving node 110.

The connector 150-3 connects the cores 201-3 and 202-3 among the cores of the MCF 200-3 to the cores 201-4 and 202-4 among the cores of the MCF 200-4. The connector 150-3 relays optical signals between the MCF 200-3 and the MCF 200-4. The connector 150-3 relays optical signals transmitted through cores other than the cores 203-3 and 203-4 that add or drop optical signals.

Figure 2A:
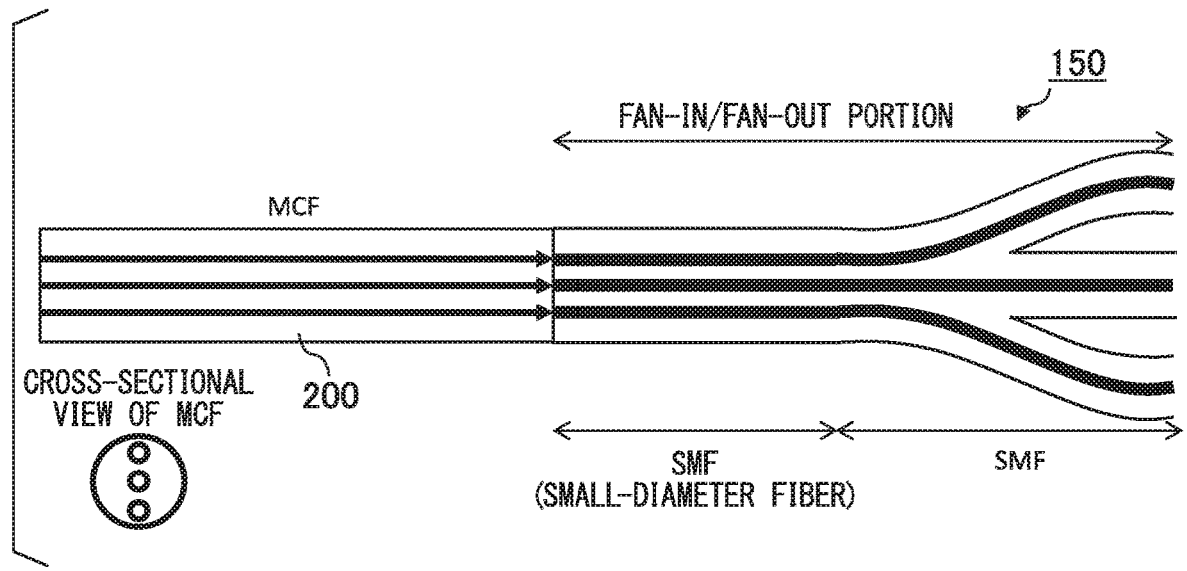
FIG. 2A is a diagram showing a first configuration example of a connector used in a communication system.
Figure 2B:
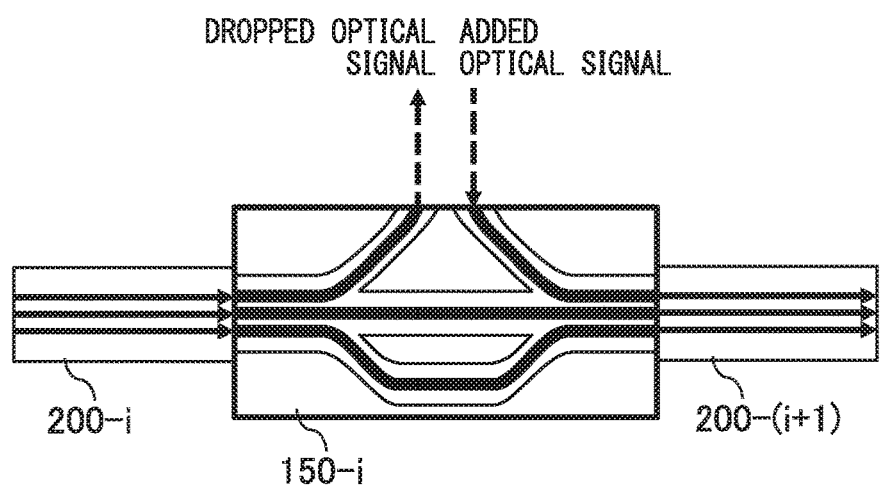
FIG. 2B is a diagram showing the first configuration example of a connector used in a communication system.

FIGS. 2A and 2B are diagrams showing a first configuration example of the connector 150 used in the communication system 100. The connector 150 includes a fan-in/fan-out portion including a plurality of small-diameter single-mode fibers (SMFs) and a plurality of SMFs. As shown in FIG. 2A, the connector 150 includes a small-diameter SMF for each of the cores of a connection target MCF 200. One set of ends of the plurality of small-diameter SMFs are provided at positions facing the cores of the MCF 200. Moreover, the other set of ends of the plurality of small-diameter SMFs are provided at positions facing one set of ends of the SMFs. Each of the small-diameter SMFs connects together the SMF and the core of the MCF 200. The connector 150 can drop optical signals transmitted through the respective cores of the MCF 200 via the small-diameter SMF and the SMF. Moreover, by inputting optical signals to the SMF, it is possible to input optical signals to the cores of the MCF 200.

The connector 150-$i$ shown in FIG. 2B connects together the MCF 200-$i$ and the MCF 200-($i$+1). The other set of ends of SMFs corresponding to cores that transmit optical signals which are an Add/Drop target are drawn out to a side surface of the connector 150-$i$. At the other set of ends of the SMFs drawn out to the side surface of the connector 150-$i$, adding and dropping (Add/Drop) of the optical signal can be performed.

The other set of ends of the SMFs corresponding to cores that transmit optical signals which are not the Add/Drop target among the cores of the MCF 200-$i$ and the other set of ends of the SMFs corresponding to cores that transmit optical signals which are not the Add/Drop target among the cores of the MCF 200-($i$+1) are provided at positions facing each other. In the connector 150-$i$, optical signals which are not the Add/Drop target are relayed from the MCF 200-$i$ to the MCF 200-($i$+1) via the small-diameter SMFs and the SMFs.

Figure 3A:
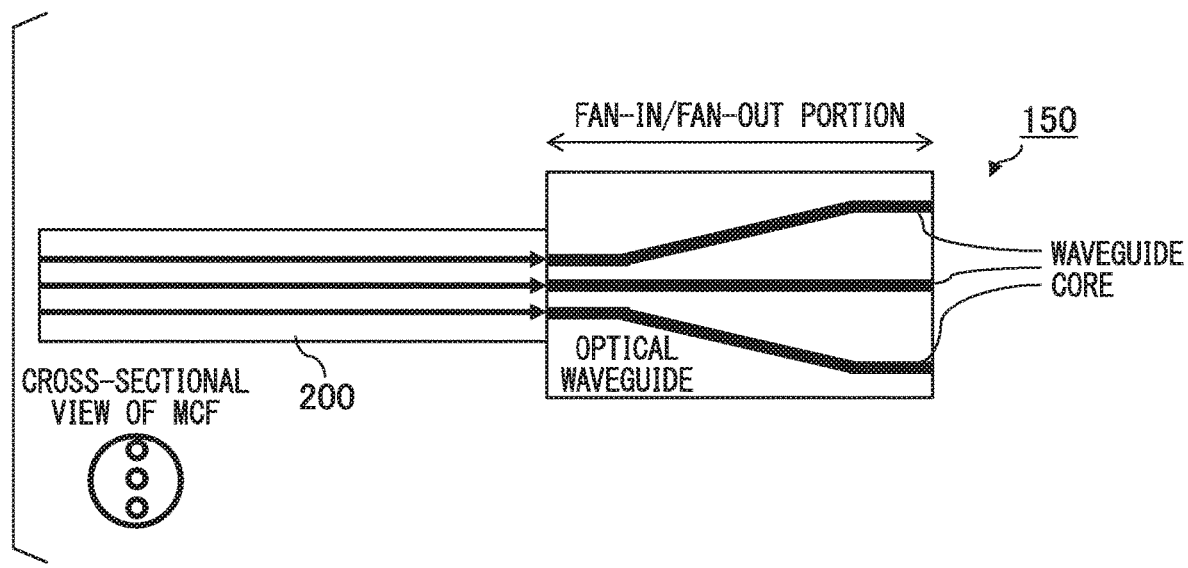
FIG. 3A is a diagram showing a second configuration example of a connector used in a communication system.
Figure 3B:
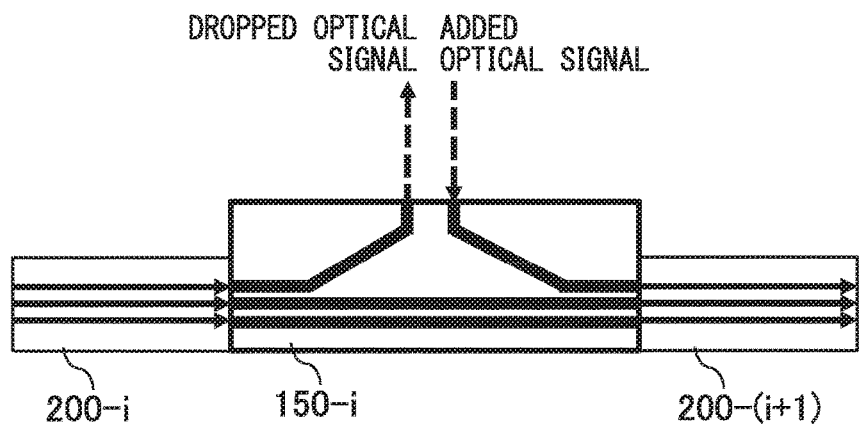
FIG. 3B is a diagram showing the second configuration example of a connector used in a communication system.

FIGS. 3A and 3B are diagrams showing a second configuration example of the connector 150 used in the communication system 100. FIGS. 3A and 3B show a configuration example different from the configuration example of the connector 150 shown in FIGS. 2A and 2B. The connector 150 shown in FIGS. 3A and 3B includes an optical waveguide including a plurality of waveguide cores formed on a glass substrate as a fan-in/fan-out portion. As shown in FIG. 3A, in the connector 150, the plurality of waveguide cores are provided at positions facing the cores of a connection target MCF 200. Optical signals transmitted through the respective cores of the MCF 200 are split via the waveguide cores. Moreover, by adding optical signals to the waveguide cores, it is possible to input optical signals to the respective cores of the MCF 200.

In the connector 150-$i$ shown in FIG. 3B, one set of ends of waveguide cores corresponding to the cores that transmit optical signals which are the Add/Drop target among the cores of the MCF 200-$i$ and the MCF 200-($i$+1) connected together by the connector 150-$i$ are provided at positions facing the cores of the MCFs. The other set of ends of the waveguide cores are provided on a side surface of the connector 150-$i$. At the other set of ends of the waveguide cores positioned on the side surface of the connector 150-$i$, adding and dropping of optical signals can be performed.

One set of ends of the waveguide cores corresponding to the cores that transmit optical signals which are not the Add/Drop target among the cores of the MCF 200-$i$ are provided at positions facing the cores of the MCF. The other set of ends of the waveguide cores are provided at positions facing the cores that transmit optical signals which are not the Add/Drop target among the cores of the MCF 200-($i$+1). The cores that transmit optical signals which are not the Add/Drop target in the MCF 200-$i$ and the MCF 200-($i$+1) are connected to waveguide cores in a one-to-one relationship. In the connector 150-$i$, the optical signals which are not the Add/Drop target are relayed from the cores of the MCF 200-$i$ to the cores of the MCF 200-($i$+1) via the waveguide cores.

The waveguide cores may be formed in a three-dimensional space as disclosed in Reference Document 1 as well as being formed in a two-dimensional space of a substrate plane.

[Reference Document 1]

R. R. Thomson, et al., "Ultrafast-laser inscription of a three dimensional fan-out device for multicore fiber coupling applications," Optics Express, OSA Publishing, 2007, Vol. 15, Issue 18, p. 11691-11697

Figure 4A:
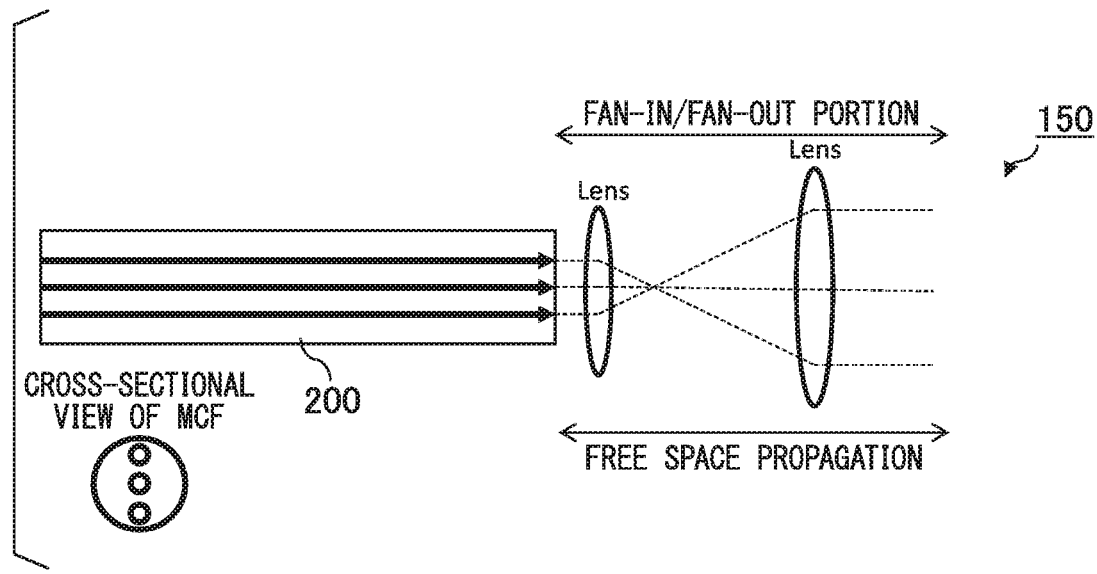
FIG. 4A is a diagram showing a third configuration example of a connector used in a communication system.
Figure 4B:
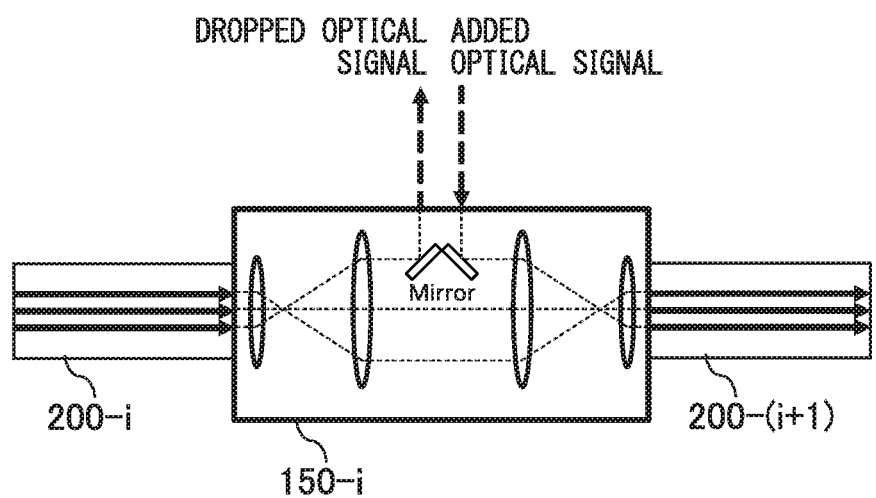
FIG. 4B is a diagram showing the third configuration example of a connector used in a communication system.

FIGS. 4A and 4B are diagrams showing a third configuration example of the connector 150 used in the communication system 100. FIGS. 4A and 4B show a configuration example different from the configuration example of the connector 150 shown in FIGS. 2A, 2B, 3A, and 3B. The connector 150 shown in FIGS. 4A and 4B causes optical signals transmitted through the respective cores of the MCF 200 to be output to a free space and causes the optical signals of the respective cores in the free space to be split by an optical system. For example, as shown in FIG. 4A, the connector 150 includes a fan-in/fan-out portion formed of two lenses. The optical signals transmitted through the respective cores of the MCF 200 are output to the free space and are split by being refracted by the two lenses. Add/Drop of optical signals are performed using an optical system. Connection of two MCFs 200 via a free space is disclosed in Reference Document 2, for example.

[Reference Document 2]

W. Klaus, et al., "Free-Space Coupling Optics for Multicore Fibers," Photonics Technology Letters, IEEE, September 2012, Volume 24, Issue 21, p. 1902-1905

FIG. 4B is a diagram showing a configuration example of the connector 150-$i$. In the connector 150-$i$ shown in FIG. 4B, the optical signals output from the respective cores of the MCF 200-$i$ are collimated by an optical system (a collimator) formed by combining two lenses. Moreover, the collimated optical signals are input to the respective cores of the MCF 200-($i$+1). A mirror that changes an optical path toward a side surface of the connector 150-$i$ is disposed in an optical path of optical signals which are the Add/Drop target. A splitting target optical signal among the optical signals which are converted to parallel light by the optical system is reflected from a mirror and is dropped to the outside of the connector 150-$i$, whereby the splitting target optical signal can be obtained. Moreover, by causing optical signals input from the outside of the connector 150-$i$ to strike the mirror, the optical signals reflected from the mirror are incident on the optical system obtained by combining two lenses together with the collimated optical signals. When the optical signals incident on the optical system are connected to the cores of the MCF 200-($i$+1), Add target optical signals can be added to the cores.

Optical signals which are not the Add/Drop target are bundled together with the added optical signals after being split by the optical system and are input to the respective cores of the MCF 200-($i$+1). In the connector 150-$i$, the optical signals which are not the Add/Drop target are relayed from the MCF 200-$i$ to the MCF 200-($i$+1) via a free space. Although two lenses are used for collimating light output from the fiber and a mirror is used for changing the propagating direction of light in the free space in the drawings, an optical device having the same function may be used.

Although FIGS. 2A, 2B, 3A, 3B, 4A, and 4B show a configuration example of the connector 150, the connector 150 may be realized using a medium and a method other than those described above. For example, a planar lightwave circuit (PLC) having an optical waveguide formed on a silicon may be used as a connector.

In the communication system 100, optical signals generated by the transmitting device 111-1 of the transceiving node 110 are received by the receiving device 122-1 of the Add/Drop node 120-1 via the core 201-1 of the MCF 200-1 and the connector 150-1. The optical signals generated by the transmitting device 111-2 are received by the receiving device 122-2 of the Add/Drop node 120-2 via the core 202-1 of the MCF 200-1, the connector 150-1, the core 202-2 of the MCF 200-2, and the connector 150-2. The optical signals generated by the transmitting device 111-3 are received by the receiving device 122-3 of the Add/Drop node 120-3 via the core 203-1 of the MCF 200-1, the connector 150-1, the core 203-2 of the MCF 200-2, the connector 150-2, the core 203-3 of the MCF 200-3, and the connector 150-3.

Moreover, the optical signals generated by the transmitting device 121-1 of the Add/Drop node 120-1 are received by the receiving device 112-1 of the transceiving node 110 via the connector 150-1, the core 201-2 of the MCF 200-2, the connector 150-2, the core 201-3 of the MCF 200-3, the connector 150-3, and the core 201-4 of the MCF 200-4. The optical signals generated by the transmitting device 121-2 of the Add/Drop node 120-2 are received by the receiving device 112-2 of the transceiving node 110 via the connector 150-2, the core 202-3 of the MCF 200-3, the connector 150-3, and the core 202-4 of the MCF 200-4. The optical signals generated by the transmitting device 121-3 of the Add/Drop node 120-3 are received by the receiving device 112-3 of the transceiving node 110 via the connector 150-3 and the core 203-4 of the MCF 200-4.

In the communication system 100, the transceiving node 110 has communication paths for transmitting and receiving signals to and from the Add/Drop nodes 120-1 to 120-3. The communication system 100 has a star-type logical topology around the transceiving node 110.

For example, by connecting together the MCFs 200 at each node using any one of the connectors 150 shown in FIGS. 2A, 2B, 3A, 3B, 4A, and 4B, it is possible to add and drop optical signals to and from predetermined cores among a plurality of cores included in the MCF 200. In the communication system 100, by connecting together the MCF 200-$i$ and the MCF 200-($i$+1) via the connector 150-$i$, it is possible to easily drop optical signals addressed to the Add/Drop node 120-$i$ and add optical signals addressed to the transceiving node 110. Since a process of dividing multiplexed optical signals having different wavelengths in respective wavelengths is not required in adding or dropping optical signals, it is possible to reduce the time and labor required for installation and maintenance of devices in the Add/Drop node 120.

Although a case in which the MCF 200 has three cores has been described, the MCF 200 may have four or more cores. When the MCF 200 has four or more cores, optical signals may be added and dropped for two or more cores of the Add/Drop node 120.

Figure 5:
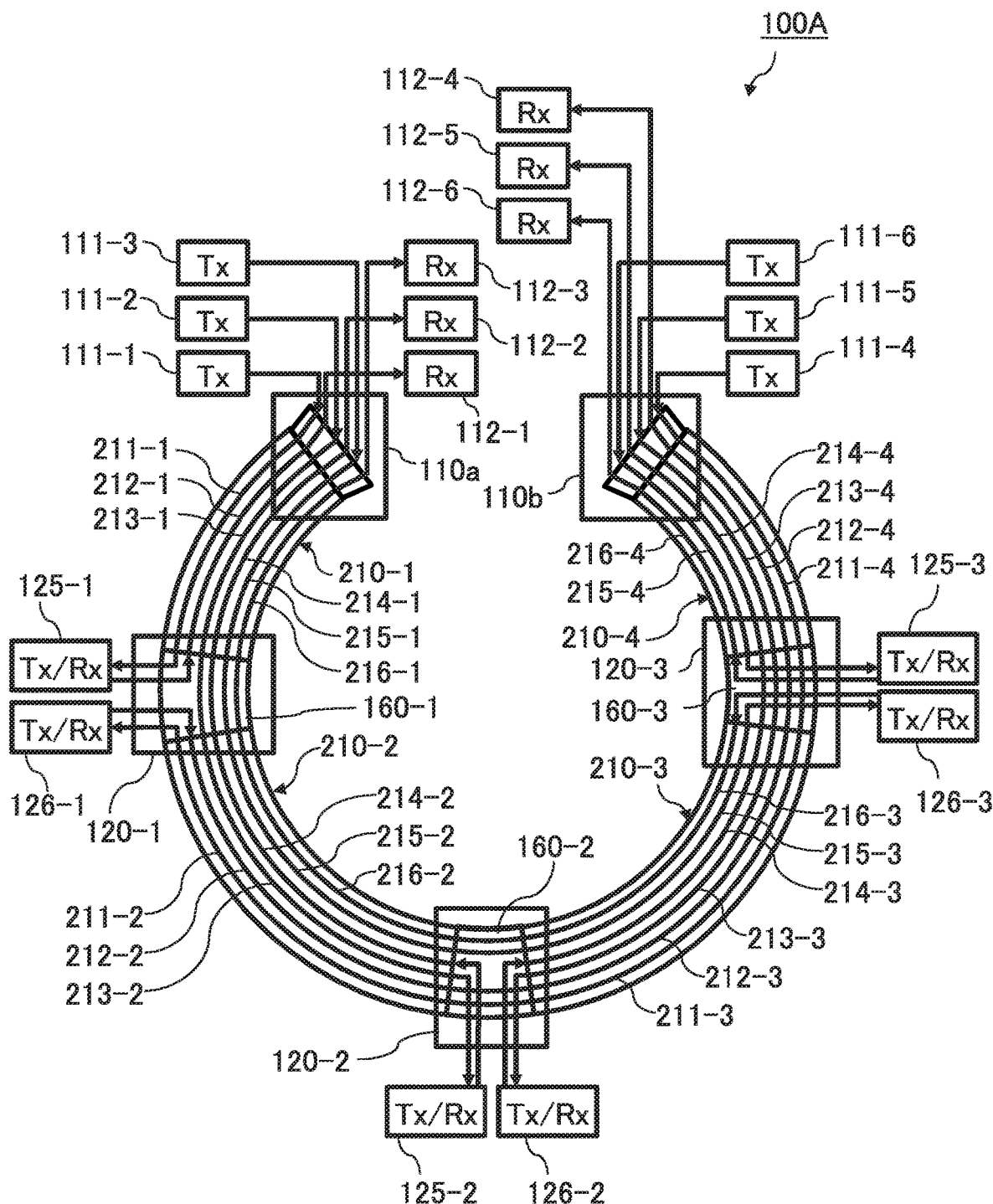
FIG. 5 is a diagram showing a second configuration example of a communication system to which an embodiment of the present invention can be applied.

FIG. 5 is a diagram showing a configuration example of a communication system 100A to which an embodiment of the present invention can be applied. The communication system 100A includes transceiving nodes 110$a$ and 110$b$ and $n$ Add/Drop nodes 120. FIG. 5 shows a configuration example of the communication system 100A when n=3. The communication system 100A is different from the communication system 100 shown in FIG. 1 in that the communication system 100A has a physical topology of a dual-system one-way ring configuration.

Nodes are connected together by MCFs 210-1 to 210-4. The transceiving node 110$a$ and the Add/Drop node 120-1 are connected together by the MCF 210-1. The Add/Drop node 120-1 and the Add/Drop node 120-2 are connected together by the MCF 210-2. The Add/Drop node 120-2 and the Add/Drop node 120-3 are connected together by the MCF 210-3. The Add/Drop node 120-3 and the transceiving node 110$b$ are connected together by the MCF 210-4. The MCFs 210-1 to 210-4 of the communication system 100A include six cores 211 to 216.

When the description of the configuration of the communication system 100A is generalized, an Add/Drop node 120-$i$ (1≤$i$≤n−1) is connected to an Add/Drop node 120-($i$+1) by an MCF 210-($i$+1). The MCF 210-1 connects together the transceiving node 110$a$ and the Add/Drop node 120-1. The MCF 210-($n$+1) connects together the Add/Drop node 120-$n$ and the transceiving node 110$b$.

Each node of the communication system 100A includes either a transmitting device (Tx) and a receiving device (Rx) that perform communication between nodes or a transceiving device (Tx/Rx). Transmitting devices 111-1 to 111-3 and receiving devices 112-1 to 112-3 are provided in the transceiving node 110$a$. Transceiving devices 125-1 and 126-1 are provided in the Add/Drop node 120-1. Transceiving devices 125-2 and 126-2 are provided in the Add/Drop node 120-2. Transceiving devices 125-3 and 126-3 are provided in the Add/Drop node 120-3. Transmitting devices 111-4 to 111-6 and receiving devices 112-4 to 112-6 are provided in the transceiving node 110$b$. In the configuration example of the communication system 100A shown in FIG. 5, a configuration in which the transmitting device 111 and the receiving device 112 are provided in the transceiving nodes 110$a$ and 110$b$, and the transceiving devices 125 and 126 are provided in the Add/Drop nodes 120-1 to 120-3 will be described. However, the transceiving devices 125 and 126 have the functions of both a transmitting device and a receiving device therein, and there is no great difference between the transceiving device and a combination of the transmitting device and the receiving device. Either a transmitting device and a receiving device or a transceiving device may be provided in the transceiving nodes 110$a$ and 110$b$ and the Add/Drop nodes 120-1 to 120-3.

The transmitting devices 111-1 to 111-3 generate optical signals to be transmitted to the Add/Drop nodes 120-1 to 120-3, respectively. The optical signals generated by the transmitting devices 111-1 to 111-3 are added to the cores 211-1, 213-1, and 215-1 of the MCF 210-1, respectively. The receiving devices 112-1 to 112-3 receive optical signals transmitted from the Add/Drop nodes 120-1 to 120-3 to the transceiving node 110$a$, respectively. The receiving devices 112-1 to 112-3 receive optical signals from the cores 212-1, 214-1, and 216-1 of the MCF 210-1, respectively.

The transmitting devices 111-4 to 111-6 generate optical signals to be transmitted to the Add/Drop nodes 120-1 to 120-3, respectively. The optical signals generated by the transmitting devices 111-4 to 111-6 are added to the cores 211-4, 213-4, and 215-4 of the MCF 210-4, respectively. The receiving devices 112-4 to 112-6 receive optical signals transmitted from the Add/Drop nodes 120-1 to 120-3 to the transceiving node 110$b$, respectively. The receiving devices 112-4 to 112-6 receive optical signals from the cores 212-4, 214-4, and 216-4 of the MCF 210-4, respectively. In the transceiving nodes 110$a$ and 110$b$, a fan-in device or a fan-out device is used for adding optical signals to the MCF 200 and dropping optical signals from the MCF 200.

A connector 160-$i$ is provided in each Add/Drop node 120-$i$ (i=1, 2, 3). The connector 160-$i$ is connected to the MCF 210-$i$ and the MCF 210-($i$+1). The connector 160-$i$ drops optical signals addressed to the subject node among the optical signals added in the transceiving nodes 110$a$ and 110$b$ from the MCF 210-$i$ and the MCF 210-($i$+1). The connector 160-$i$ adds an optical signal addressed to the transceiving node 110$a$ to the cores of the MCF 210-$i$. The connector 160-$i$ adds an optical signal addressed to the transceiving node 110$b$ to the cores of the MCF 210-($i$+1).

In the Add/Drop node 120-1, the connector 160-1 drops an optical signal addressed to the subject node from the core 211-1 of the MCF 210-1. The connector 160-1 connects the dropped optical signal to the transceiving device 125-1. Moreover, the connector 160-1 adds an optical signal generated by the transceiving device 125-1 to the core 212-1 of the MCF 210-1. The optical signal added to the core 212-1 is an optical signal which is transmitted from the subject node to the transceiving node 110$a$.

Furthermore, the connector 160-1 drops an optical signal addressed to the subject node from the core 211-2 of the MCF 210-2. The connector 160-1 connects the dropped optical signal to the transceiving device 126-1. Moreover, the connector 160-1 adds an optical signal generated by the transceiving device 126-1 to the core 212-2 of the MCF 210-2. The optical signal added to the core 212-2 is an optical signal which is transmitted from the subject node to the transceiving node 110$b$.

The connector 160-1 connects the cores 213-1 to 216-1 among the cores of the MCF 210-1 to the cores 213-2 to 216-2 among the cores of the MCF 210-2, respectively. The connector 160-1 relays optical signals between the MCF 210-1 and the MCF 210-2. The connector 160-1 relays optical signals transmitted through cores other than the cores 211-1, 212-1, 211-2, and 212-2 through which optical signals are added or dropped.

In the Add/Drop node 120-2, the connector 160-2 drops an optical signal addressed to the subject node from the core 213-2 of the MCF 210-2. The connector 160-2 connects the dropped optical signal to the transceiving device 125-2. Moreover, the connector 160-2 adds an optical signal generated by the transceiving device 125-2 to the core 214-2 of the MCF 210-2. The optical signal added to the core 214-2 is an optical signal which is transmitted from the subject node to the transceiving node 110a.

Furthermore, the connector 160-2 drops an optical signal addressed to the subject node from the core 213-3 of the MCF 210-3. The connector 160-2 connects the dropped optical signal to the transceiving device 126-2. Moreover, the connector 160-2 adds an optical signal generated by the transceiving device 126-2 to the core 214-3 of the MCF 210-3. The optical signal added to the core 214-3 is an optical signal which is transmitted from the subject node to the transceiving node 110b.

The connector 160-2 connects the cores 211-2, 212-2, 215-2, and 216-2 among the cores of the MCF 210-2 to the cores 211-3, 212-3, 215-3, and 216-3 among the cores of the MCF 210-3, respectively. The connector 160-2 relays optical signals between the MCF 210-2 and the MCF 210-3. The connector 160-2 relays optical signals transmitted through cores other than the cores 213-2, 214-2, 213-3, and 214-3 through which optical signals are added or dropped.

In the Add/Drop node 120-3, the connector 160-3 drops an optical signal addressed to the subject node from the core 215-3 of the MCF 210-3. The connector 160-3 connects the dropped optical signal to the transceiving device 126-3. Moreover, the connector 160-3 adds an optical signal generated by the transceiving device 126-3 to the core 216-3 of the MCF 210-3. The optical signal added to the core 216-3 is an optical signal which is transmitted from the subject node to the transceiving node 110a.

Furthermore, the connector 160-3 drops an optical signal addressed to the subject node from the core 215-4 of the MCF 210-4. The connector 160-4 connects the dropped optical signal to the transceiving device 125-3. Moreover, the connector 160-3 adds an optical signal generated by the transceiving device 125-3 to the core 216-3 of the MCF 210-4. The optical signal added to the core 216-4 is an optical signal which is transmitted from the subject node to the transceiving node 110b.

The connector 160-3 connects the cores 211-3 to 214-3 among the cores of the MCF 210-3 to the cores 211-4 to 214-4 among the cores of the MCF 210-4, respectively. The connector 160-3 relays optical signals between the MCF 210-3 and the MCF 210-4. The connector 160-3 relays optical signals transmitted through cores other than the cores 215-3, 216-3, 215-4, and 216-4 through which optical signals are added or dropped.

The connectors 160-1 to 160-3 of the communication system 100A can be configured similarly to the connectors 150-1 to 150-3 of the communication system 100 by using the small-diameter fiber, the optical waveguide, the optical system, and the like as shown in FIGS. 2A, 2B, 3A, 3B, 4A, and 4B.

In the communication system 100A, transmission communication paths and reception communication paths are formed between the transceiving nodes 110a and 110b and the Add/Drop nodes 120-1 to 120-3. The transceiving nodes 110a and 110b can communicate with the Add/Drop nodes 120-1 to 120-3 individually. In this manner, the communication system 100A has a tree-type logical topology in which the transceiving nodes 110a and 110b are used as root nodes.

The Add/Drop nodes 120-1 to 120-3 may use any one of the communication paths directed to the two transceiving nodes 110a and 110b as an active system (0-system) and use the other as a standby system (1-system). Moreover, the Add/Drop nodes 120-1 to 120-3 may use a communication path of the shorter transmission distance as the 0-system and use a communication path of the longer transmission distance as the 1-system. In the Add/Drop nodes 120-1 to 120-3, since a process of dividing multiplexed optical signals having different wavelengths in respective wavelengths is not required in adding or dropping optical signals, it is possible to reduce the time and labor required for installation and maintenance of devices.

Although a case in which each MCF 210 has six cores 211 to 216 has been described, the MCF 210 may have seven or more cores. When the MCF 210 has seven or more cores, optical signals may be added and dropped for two or more cores of the Add/Drop node 120.

Moreover, the transceiving node 110a and the transceiving node 110b may be connected together using the MCF 210 or a MCF having seven or more cores. In the communication system 100A, when the roles of the transceiving nodes 110a and 110b and the Add/Drop nodes 120-1 to 120-3 are changed, a logical topology can be easily changed by attaching a connector to the transceiving nodes 110a and 110b and replacing the connector 150 of each of the Add/Drop nodes 120-1 to 120-3 with another connector. In this way, it is possible to flexibly cope with a change in the network configuration.

Figure 6:
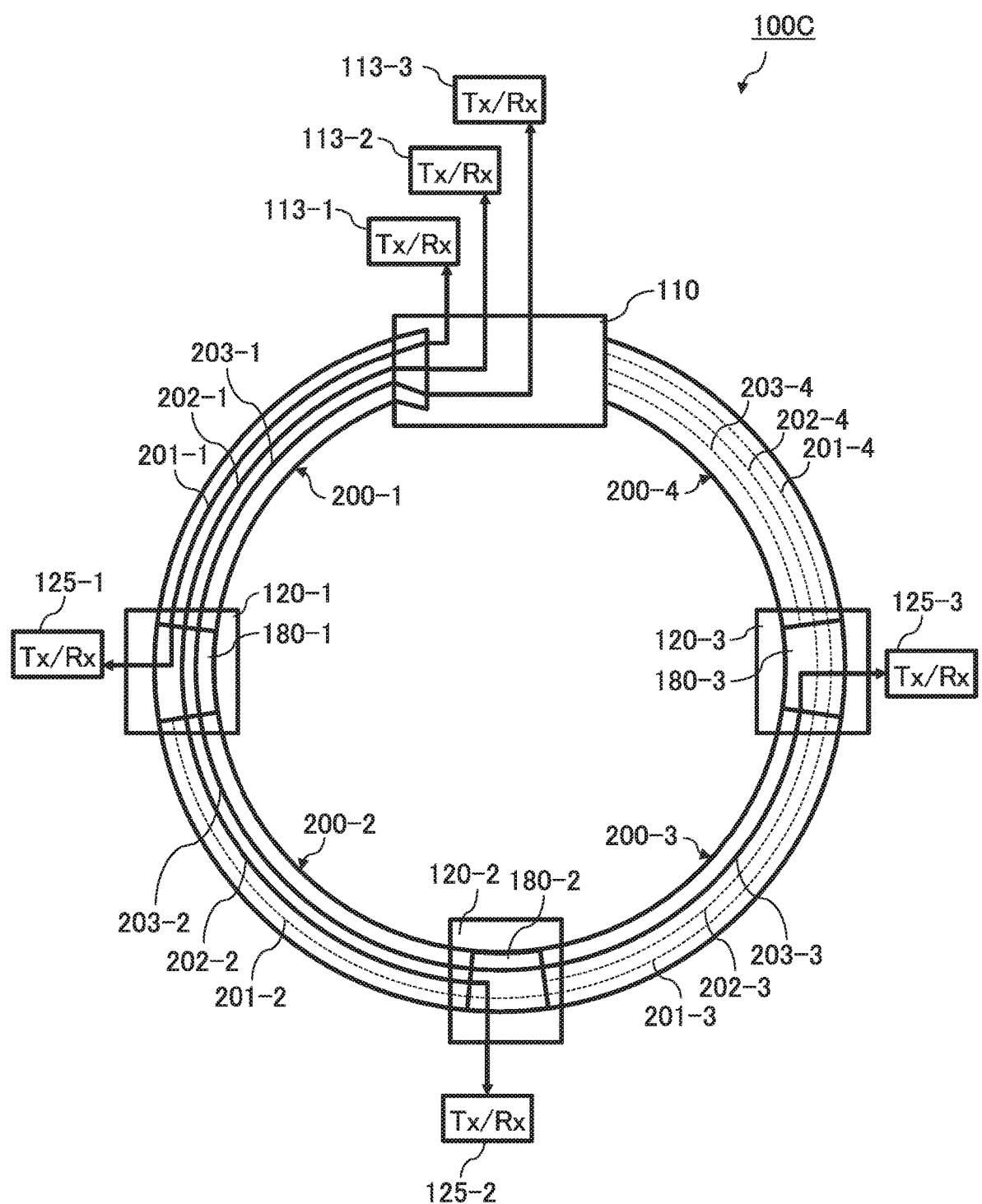
FIG. 6 is a diagram showing a third configuration example of a communication system to which an embodiment of the present invention can be applied.

FIG. 6 is a diagram showing a configuration example of a communication system 100C to which an embodiment of the present invention can be applied. The communication system 100C includes a transceiving node 110 and n Add/Drop nodes 120. FIG. 6 shows a configuration example of the communication system 100C when n=3. In the communication system 100C, the connection of MCFs 200-1 to 200-4 between nodes is similar to the connection in the communication system 100. In the communication system 100C, communication from the transceiving node 110 to each of the Add/Drop nodes 120 and communication from each of the Add/Drop nodes 120 to the transceiving node 110 are performed using the same core. When optical signals of which the transmission directions are different are transmitted using the same core, the strength of optical signals may be suppressed to a certain level or lower in order to suppress the influence of different optical signals and the wavelengths of optical signals may be different in respective transmission directions. The communication system 100C is different from the communication system 100 of the first embodiment in that the communication system 100C has a physical topology of a single-system two-way ring configuration.

Each node of the communication system 100C includes a transceiving device (Tx/Rx) that performs communication between nodes. Transceiving devices 113-1 to 113-3 are provided in the transceiving node 110. Transceiving devices 125-1 to 125-3 are provided in the Add/Drop nodes 120-1 to 120-3, respectively. The transceiving devices 113-1 to 113-3 generate optical signals to be transmitted to the Add/Drop nodes 120-1 to 120-3, respectively. Moreover, the transceiving devices 113-1 to 113-3 receive optical signals transmitted from the Add/Drop nodes 120-1 to 120-3, respectively, and acquire information included in the optical signals. The transceiving devices 125-1 to 125-3 generate optical signals to be transmitted to the transceiving node 110. Moreover, the transceiving devices 125-1 to 125-3 receive optical signals transmitted from the transceiving node 110 and acquire information included in the optical signals.

The transceiving devices 113-1 to 113-3 generate optical signals to be transmitted to the Add/Drop nodes 120-1 to 120-3, respectively. Three optical signals generated by the transceiving devices 113-1 to 113-3 are added to the cores 201-1 to 203-1 of the MCF 200-1, respectively. Moreover, the transceiving devices 113-1 to 113-3 receive optical signals from the Add/Drop nodes 120-1 to 120-3 via the cores 201-1 to 203-1 of the MCF 200-1, respectively. A fan-in device or a fan-out device is used for adding optical signals to the MCF 200-1 and dropping optical signals from the MCF 200-1.

A connector 180-$i$ is provided in each Add/Drop node 120-$i$ ($i$=1, 2, 3). The connector 180-$i$ is connected to the MCF 200-$i$ and the MCF 200-($i$+1). The connector 180-$i$ drops an optical signal from the core 20$i$-$i$ of the MCF 200-$i$ and connects the dropped optical signal to the transceiving device 125-$i$. Moreover, the connector 180-$i$ adds an optical signal generated by the transceiving device 125-$i$ to the core 20$i$-$i$ of the MCF 200-$i$. The optical signal generated by the transceiving device 125-$i$ is an optical signal transmitted from the Add/Drop node 120-$i$ to the transceiving node 110. The connector 180-$i$ connects together the cores 20$i$-$i$ and 20$i$-($i$+1) other than the Add/Drop target cores among the cores of the MCF 200-$i$ and the cores of the MCF 200-($i$+1) to relay optical signals.

The transceiving node 110 and the Add/Drop node 120-1 perform two-way communication using a communication path formed by the core 201-1. The transceiving node 110 and the Add/Drop node 120-2 perform two-way communication using a communication path formed by the cores 202-1 and 202-2. The transceiving node 110 and the Add/Drop node 120-3 perform two-way communication using a communication path formed by the cores 203-1, 203-2, and 203-3. The core 201-2 of the MCF 200-2, the cores 201-3 and 202-3 of the MCF 200-3, and the cores 201-4 to 203-4 of the MCF 200-4 are cores which are not used in communication.

In the communication system 100C, the Add/Drop node 120-3 may perform communication with the transceiving node 110 using the core 201-4 of the MCF 200-4 to shorten a communication path. In this case, a fan-in device or a fan-out device is necessary in a connecting portion with the MCF 200-4 in the transceiving node 110.

Figure 7:
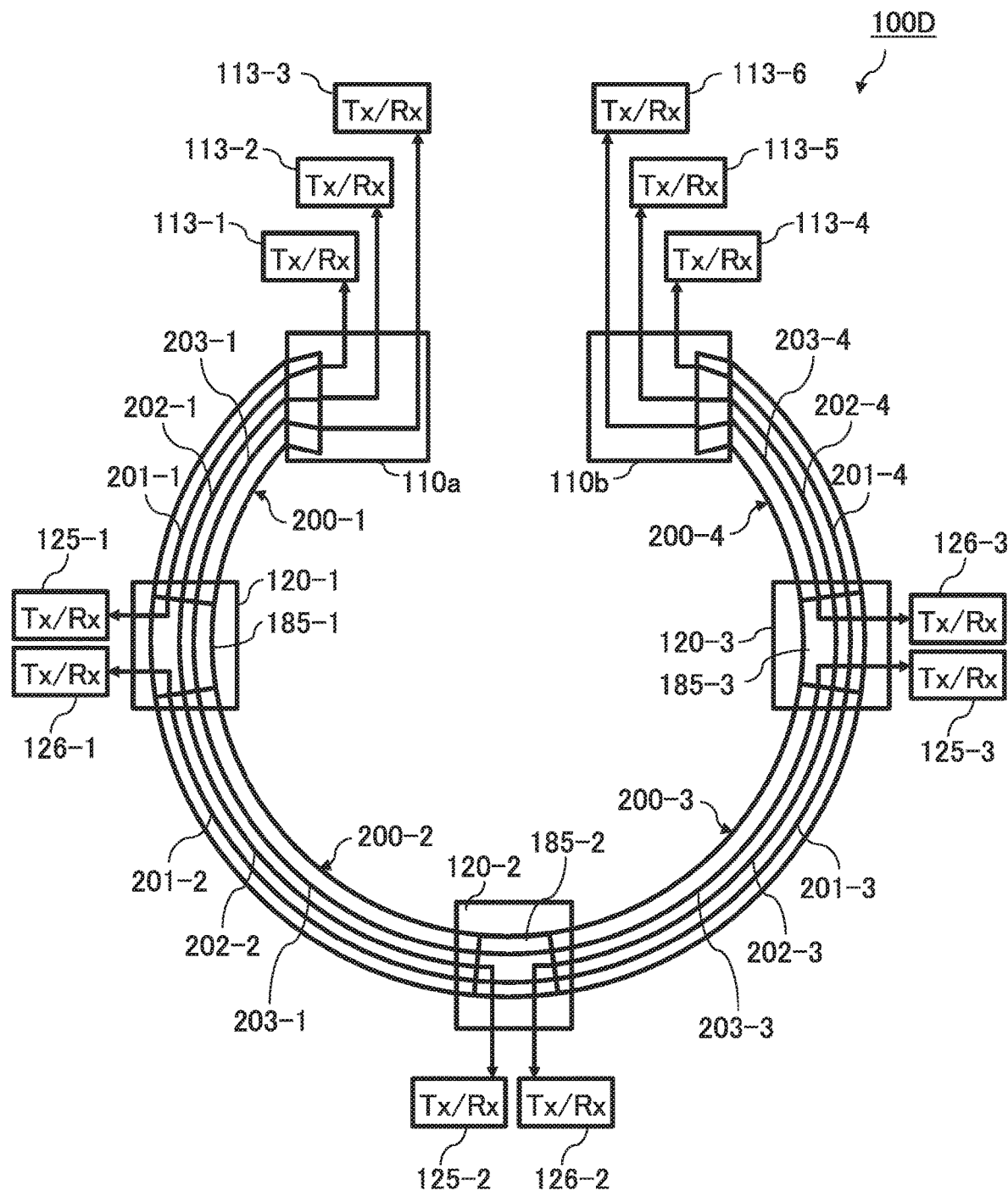
FIG. 7 is a diagram showing a fourth configuration example of a communication system to which an embodiment of the present invention can be applied.

FIG. 7 is a diagram showing a configuration example of a communication system 100D to which an embodiment of the present invention can be applied. The communication system 100D includes transceiving nodes 110$a$ and 110$b$ and $n$ Add/Drop nodes 120. FIG. 7 shows a configuration example of the communication system 100D when n=3. In the communication system 100D, the connection of MCFs 200-1 to 200-4 between nodes is similar to the connection of MCFs 210-1 to 210-4 of the communication system 100A. In the communication system 100D, communication from the transceiving nodes 110$a$ and 110$b$ to the respective Add/Drop nodes 120 and communication from the Add/Drop nodes 120 to the transceiving nodes 110$a$ and 110$b$ are performed using the same core. The communication system 100D has a physical topology of a duel-system two-way ring configuration.

Each node of the communication system 100D includes a transceiving device (Tx/Rx) that performs communication between nodes. Transceiving devices 113-1 to 113-3 are provided in the transceiving node 110$a$. Transceiving devices 113-4 to 113-6 are provided in the transceiving node 110$b$. Transceiving devices 125-1 to 125-3 and 126-1 to 126-3 are provided in the Add/Drop nodes 120-1 to 120-3, respectively. The transceiving devices 113-1 to 113-6 generate optical signals to be transmitted to the Add/Drop nodes 120-1 to 120-3, respectively. The transceiving devices 125-1 to 125-3 generate optical signals to be transmitted to the transceiving node 110$a$. The transceiving devices 126-1 to 126-3 generate optical signals to be transmitted to the transceiving node 110$b$. Moreover, the transceiving devices 113-1 to 113-6 receive optical signals transmitted from the Add/Drop nodes 120-1 to 120-3, respectively, and acquire information included in the optical signals. The transceiving devices 125-1 to 125-3 receive optical signals transmitted from the transceiving node 110$a$ and acquire information included in the optical signals. The transceiving devices 126-1 to 126-3 receive optical signals transmitted from the transceiving node 110$b$ and acquire information included in the optical signals.

In the transceiving node 110$a$, the transceiving devices 113-1 to 113-3 generate optical signals to be transmitted to the Add/Drop nodes 120-1 to 120-3, respectively. Three optical signals generated by the transceiving devices 113-1 to 113-3 are added to the cores 201-1 to 203-1 of the MCF 200-1, respectively. Moreover, the transceiving devices 113-1 to 113-3 receive optical signals from the Add/Drop nodes 120-1 to 120-3 via the cores 201-1 to 203-1 of the MCF 200-1, respectively. A fan-in device or a fan-out device is used for adding optical signals to the MCF 200-1 and dropping optical signals from the MCF 200-1.

In the transceiving node 110$b$, the transceiving devices 113-4 to 113-6 generate optical signals to be transmitted to the Add/Drop nodes 120-1 to 120-3, respectively. Three optical signals generated by the transceiving devices 113-4 to 113-6 are added to the cores 201-4 to 203-4 of the MCF 200-4, respectively. Moreover, the transceiving devices 113-4 to 113-6 receive optical signals from the Add/Drop nodes 120-1 to 120-3 via the cores 201-4 to 203-4 of the MCF 200-4, respectively. A fan-in device or a fan-out device is used for adding optical signals to the MCF 200-4 and dropping optical signals from the MCF 200-4 similarly to the transceiving node 110$a$.

A connector 185-$i$ is provided in each Add/Drop node 120-$i$ ($i$=1, 2, 3). The connector 185-$i$ is connected to the MCF 200-$i$ and the MCF 200-($i$+1). The connector 185-$i$ drops an optical signal from the core 20$i$-$i$ of the MCF 200-$i$ and connects the dropped optical signal to the transceiving device 125-$i$. The connector 185-$i$ adds an optical signal generated by the transceiving device 125-$i$ to the core 20$i$-$i$ of the MCF 200-$i$. The optical signal generated by the transceiving device 125-$i$ is an optical signal which is transmitted from the Add/Drop node 120-$i$ to the transceiving node 110$a$.

Moreover, the connector 185-$i$ drops an optical signal from the core 20$i$-($i$+1) of the MCF 200-($i$+1) and connects the dropped optical signal to the transceiving device 126-$i$. The connector 185-$i$ adds an optical signal generated by the transceiving device 126-$i$ to the core 20$i$-($i$+1) of the MCF 200-($i$+1). The optical signal generated by the transceiving device 126-*i* is an optical signal which is transmitted from the Add/Drop node 120-*i* to the transceiving node 110*b*.

Moreover, the connector 185-*i* connects together the core 20*i*-*i* and the core 20*i*-(*i*+1) other than the cores which are the Add/Drop target among the cores of the MCF 200-*i* and the cores of the MCF 200-(*i*+1) to relay optical signals.

The transceiving node 110*a* and the Add/Drop node 120-1 perform two-way communication using a communication path formed by the core 201-1. The transceiving node 110*a* and the Add/Drop node 120-2 perform two-way communication using a communication path formed by the cores 202-1 and 202-2. The transceiving node 110*a* and the Add/Drop node 120-3 perform two-way communication using a communication path formed by the cores 203-1, 203-2, and 203-3.

The transceiving node 110*b* and the Add/Drop node 120-1 perform two-way communication using a communication path formed by the cores 201-4, 201-3, and 201-2. The transceiving node 110*b* and the Add/Drop node 120-2 perform two-way communication using a communication path formed by the cores 202-4 and 202-3. The transceiving node 110*b* and the Add/Drop node 120-3 perform two-way communication using a communication path formed by the core 203-4.

In this manner, the communication system 100D has a tree-type logical topology in which the transceiving nodes 110*a* and 110*b* are used as root nodes and can communicate with each of the Add/Drop nodes 120-1 to 120-3. In the communication system 100D, the Add/Drop nodes 120-1 to 120-3 each can communicate with the transceiving nodes 110*a* and 110*b*. The Add/Drop nodes 120-1 to 120-3 may use any one of the communication paths between the two transceiving nodes 110*a* and 110*b* as an active system (0-system) and use the other as a standby system (1-system). Moreover, the Add/Drop nodes 120-1 to 120-3 may use a communication path of the shorter transmission distance as the 0-system and use a communication path of the longer transmission distance as the 1-system.

In the communication system 100D, the transceiving node 110*a* and the transceiving node 110*b* may be connected together using the MCF 200 or an MCF having four or more cores. In the communication system 100D, when the roles of the transceiving nodes 110*a* and 110*b* and the Add/Drop nodes 120-1 to 120-3 are changed, a logical topology can be easily changed by attaching a connector to the transceiving nodes 110*a* and 110*b* and replacing the connector 185 of the respective Add/Drop nodes 120-1 to 120-3 with another connector. In this way, it is possible to flexibly cope with a change in the network configuration.

Four communication systems 100, 100A, 100C, and 100D have been described as a communication system to which an embodiment of the present invention can be applied. In the communication systems, a configuration in which MCF is used in one or a plurality of connections between nodes has been described. However, an optical amplification method described in the following embodiments may be applied to a communication system in which a single core fiber (SCF) is used for connection between nodes. When SCFs are used for connection between nodes, a conversion connector that connects an MCF to a plurality of SCFs or a conversion connector that connects a connector to a plurality of SCFs is used.

Figure 8:
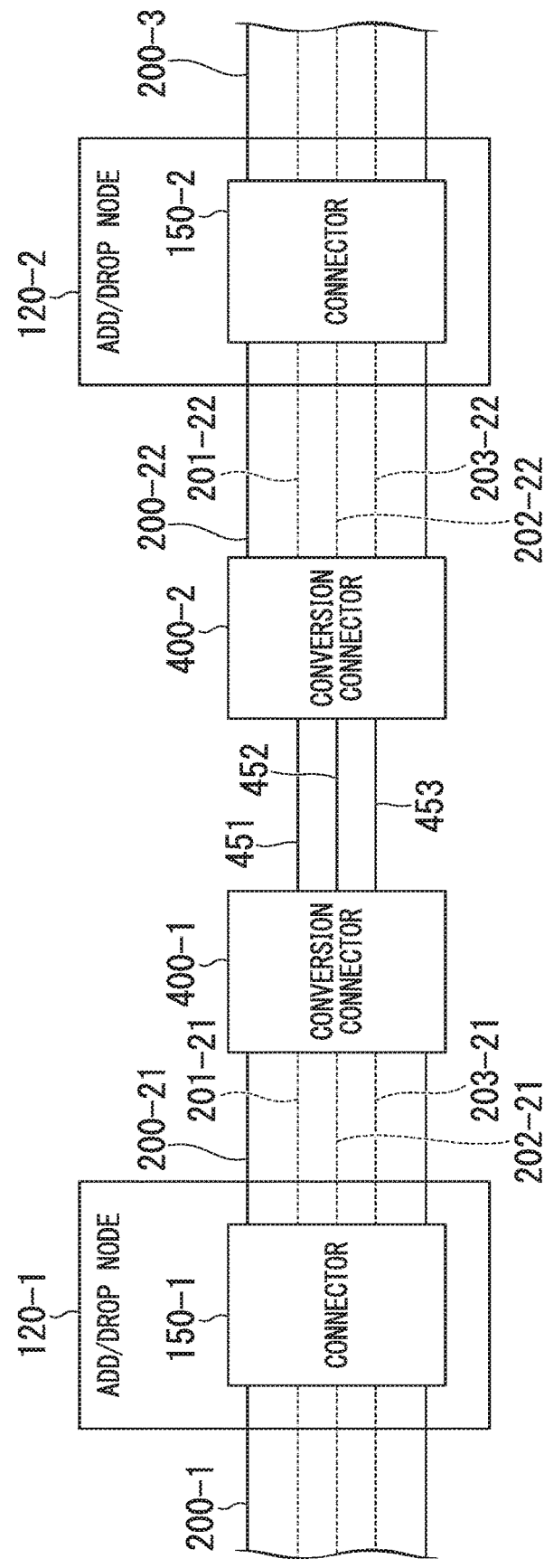
FIG. 8 is a diagram showing a first configuration example of the communication system shown in FIG. 1, in which a plurality of SCFs is used in a partial segment of the connection between Add/Drop nodes.

FIG. 8 is a block diagram showing a first configuration example in which a plurality of SCFs 451, 452, and 453 are used in a partial segment of the connection between the Add/Drop node 120-1 and the Add/Drop node 120-2 in the communication system 100 shown in FIG. 1. The SCFs 451, 452, and 453 are used between the MCF 200-21 connected to the connector 150-1 and the MCF 200-22 connected to the connector 150-2.

A conversion connector 400-1 is used for connection between the MCF 200-21 and the SCFs 451 to 453. The conversion connector 400-1 connects the cores 201-21, 202-21, and 203-21 of the MCF 200-21 to the SCFs 451, 452, and 453, respectively. A conversion connector 400-2 is used for connection between the MCF 200-22 and the SCFs 451 to 453. The conversion connector 400-2 connects the cores 201-22, 202-22, and 203-22 of the MCF 200-22 to the SCFs 451, 452, and 453, respectively.

The conversion connectors 400-1 and 400-2 have a configuration similar to that of a fan-in device or a fan-out device. By using the conversion connectors 400-1 and 400-2, it is possible to use the SCF in a partial segment of the connection between nodes.

Figure 9:
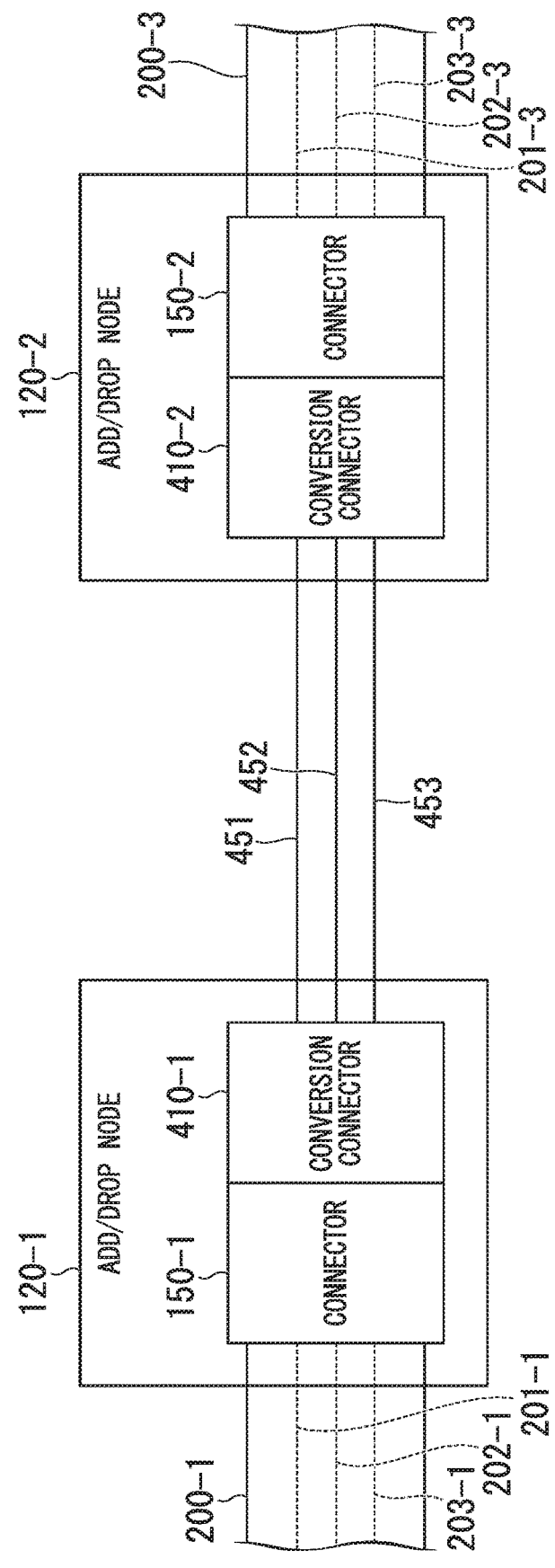
FIG. 9 is a diagram showing a second configuration example of the communication system shown in FIG. 1, in which a plurality of SCFs is used in the connection between Add/Drop nodes.

FIG. 9 is a block diagram showing a second configuration example of the communication system 100 shown in FIG. 1 in which a plurality of SCFs 451, 452, and 453 are used in the connection between the Add/Drop node 120-1 and the Add/Drop node 120-2. The SCFs 451, 452, and 453 are used for the connection between the connector 150-1 and the connector 150-2. The configuration example shown in FIG. 9 is different from the configuration example shown in FIG. 8 in that an MCF is not used for the connection between the Add/Drop nodes 120-1 and 120-2.

The Add/Drop node 120-1 further includes a conversion connector 410-1. The conversion connector 410-1 is attached to a side of the connector 150-1 close to the Add/Drop node 120-2. The Add/Drop node 120-2 further includes a conversion connector 410-2. The conversion connector 410-2 is attached to a side of the connector 150-2 close to the Add/Drop node 120-1. The SCFs 451 to 453 of the same number as the number of cores of the MCF 200 are used for the connection between the conversion connectors 410-1 and 410-2.

The conversion connector 410-1 connects the SCFs 451, 452, and 453 to the connector 150-1. The connector 150-1 performs input/output of optical signals from/to the conversion connector 410-1 instead of the MCF 200-2. The connector 150-1 connects the cores 202-1 and 203-1 of the MCF 200-1 to the SCFs 452 and 453, respectively, via the conversion connector 410-1. The conversion connector 410-1 adds an optical signal generated by the transmitting device 121-1 to the SCF 451 via the connector 150-1.

The conversion connector 410-2 connects the SCFs 451, 452, and 453 to the connector 150-2. The connector 150-2 performs input/output of optical signals from/to the conversion connector 410-2 instead of the MCF 200-2. The connector 150-2 connects the SCF 451 and 453 to the cores 201-3 and 203-3 of the MCF 200-3, respectively, via the conversion connector 410-2. The connector 150-2 connects an optical signal dropped from the SCF 453 to the receiving device 122-2 via the conversion connector 410-2.

The conversion connectors 410-1 and 410-2 has a configuration similar to that of a fan-in device or a fan-out device. By using the conversion connectors 410-1 and 410-2, it is possible to use the SCF for the connection between nodes.

FIGS. 8 and 9 show configuration examples in which nodes are connected together using the SCFs instead of the MCF 200 having three cores. SCFs may be used for the connection between nodes instead of the MCF having two cores or four or more cores. In this case, similarly, a conversion connector is used.

FIGS. 8 and 9 show an example in which SCFs are used for the connection between the Add/Drop nodes 120-1 and 120-2 of the communication system 100 shown in FIG. 1. The SCF may be used for the connection between other nodes. In this case, the conversion connector 400 may be used for the connection between one set of nodes and the conversion connector 410 may be used for the connection between the other set of nodes. Moreover, a combination of the conversion connector 400 that connects together an MCF and a SCF and the conversion connector 410 connected to the connector 150 may be used for the connection between one set of nodes. For example, the conversion connector 400 may be used in the Add/Drop node 120-1, and the conversion connector 410 may be used in the Add/Drop node 120-2.

MCF and SCF may be switched a plurality of times for the connection between one set of nodes. For example, MCF and SCF may be used for the connection between the Add/Drop nodes 120-1 and 120-2 in the order of MCF, SCF, MCF, SCF, and MCF. In this case, a conversion connector is used between the MCF and the SCF.

The connector 150-1 and the conversion connector 410-1 described in FIG. 9 may be configured as one connector. Similarly, the connector 150-2 and the conversion connector 410-2 may be configured as one connector. That is, a connector connected to the MCF and the plurality of SCFs may add or drop optical signals to or from the MCF or the SCF and may relay optical signals between the MCF and the SCF.

As described above, the SCF may be used in one or a plurality of connections between the nodes in the communication system 100 shown in FIG. 1 and the other communication systems.

Next, embodiments of the present invention will be described.

In the present embodiment, optical amplification of an optical signal (communication light for transmitting signals) propagating through a multi-core fiber is performed. Hereinafter, optical amplification will be referred to simply as "amplification." As the optical amplification according to the present embodiment, Raman amplification or erbium-doped fiber amplifier (EDFA) amplification is used. Raman amplification includes distributed Raman amplification and lumped Raman amplification and either one of them may be used. The distributed Raman amplification is amplification which uses an already-laid optical fiber transmission path itself as an amplification medium. The lumped Raman amplification is amplification performed locally in a highly nonlinear optical fiber connected to a transmission path. The distributed Raman amplification generates less noise (signal deterioration is suppressed), but an amplification efficiency depends on an optical fiber. Moreover, the lumped Raman amplification provides a high gain and an amplification medium can be selected, but it generates much noise (signals deteriorate). On the other hand, an EDFA uses an optical fiber doped with a rare earth element as an amplification medium. Since an amplification medium is based on an optical fiber structure, it is possible to provide a satisfactory connection property between fibers, a satisfactory matching property with other optical components and to decrease a connection loss. In Raman amplification and EDFA amplification, amplification is performed when an optical signal and amplification excitation light enter an amplification medium (an optical fiber). The amplification methods described above can be used, or other amplification methods may be used.

Excitation (pumping) is classified into two types of forward pumping and backward pumping depending on a direction in which an optical signal and an amplification excitation light are input. In the forward pumping, an optical signal and an excitation light propagate in the same direction. In the backward pumping, an optical signal and an excitation light propagate in opposite directions Optical amplification according to the present embodiment is classified into two types: a case of amplifying at each node in a uniform manner and a case of individually amplifying at specific nodes depending on a difference in amplification portion. The former is referred to as uniform node amplification and the latter is referred to as specific node amplification.

Figure 10:
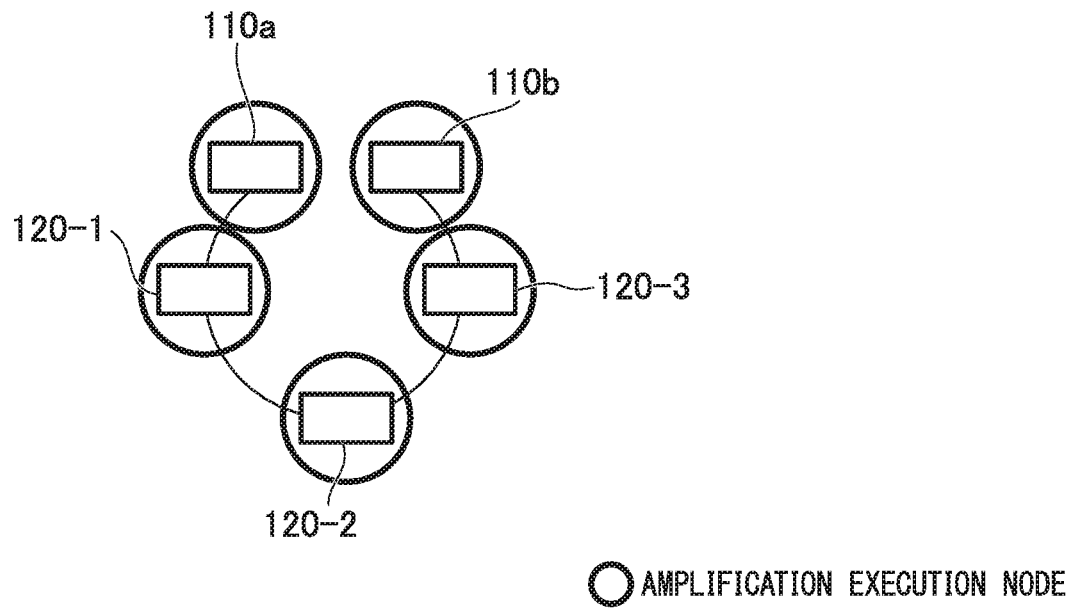
FIG. 10 is a diagram showing an example of uniform node amplification according to an embodiment of the present invention.

FIG. 10 is a diagram showing an example of uniform node amplification. This diagram schematically shows the communication system 100A shown in FIG. 5. All nodes including the transceiving nodes 110a and 110b and the Add/Drop nodes 120-1 to 120-3 are amplification target nodes. When a communication system has relay nodes, amplification is performed in all relay nodes. In the uniform node amplification, each of the nodes that form the communication system amplifies all cores of an MCF or a plurality of partial cores in a uniform manner. The aim of the uniform node amplification is to perform amplification in order to compensate for a transmission loss between nodes.

Figure 11:
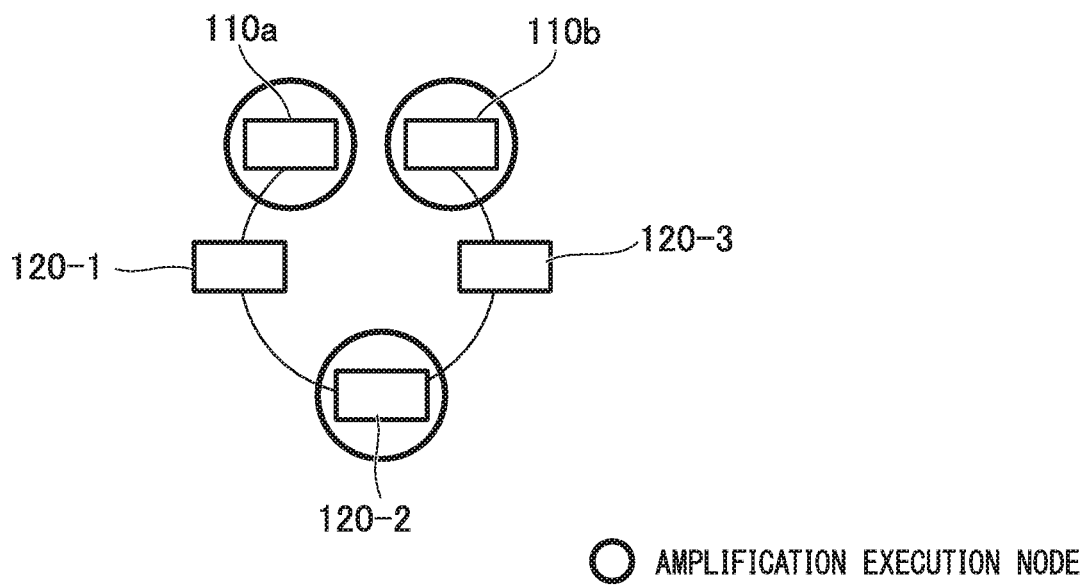
FIG. 11 is a diagram showing an example of specific node amplification according to an embodiment of the present invention.

FIG. 11 is a diagram showing an example of specific node amplification. This diagram schematically shows the communication system 100A shown in FIG. 5. Some nodes (the transceiving nodes 110a and 110b and the Add/Drop node 120-2) among the nodes that form the communication system 100A are amplification target nodes. When a communication system has a relay node, amplification may be performed in the relay node. In the specific node amplification, some nodes amplify all cores of an MCF or a plurality of partial cores while changing a proportion. A plurality of cores may be amplified in a uniform manner. By performing amplification in necessary portions only, it is possible to perform optical amplification efficiently. Moreover, a laser used for amplification requires high output power and is relatively fragile as compared to passive components. Due to this, a reduction in the number of amplification portions can lead to a reduction in the number of faults.

Hereinafter, respective embodiments will be described in detail.

First Embodiment

In a first embodiment, uniform node amplification is performed according to Raman amplification.

Figure 12:
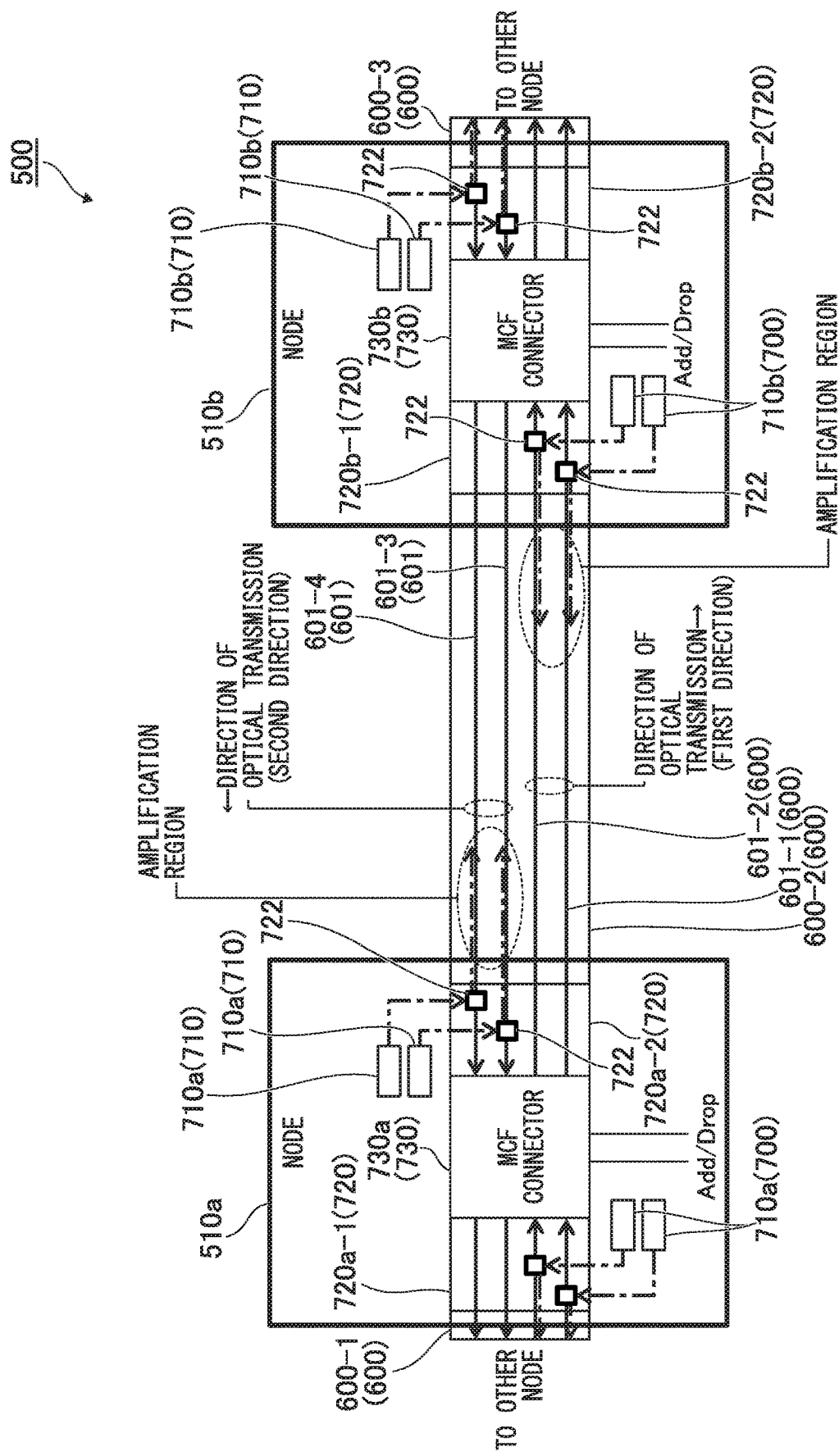
FIG. 12 is a diagram showing a configuration example of an optical amplification system according to a first embodiment.

FIG. 12 is a diagram showing a configuration example of an optical amplification system 500 according to the first embodiment. The optical amplification system 500 includes a node 510a and a node 510b connected together by an MCF 600. The node 510a and the node 510b are collectively referred to as a node 510. The optical amplification system 500 uses cores 601 of the MCF 600 for one-way signal transmission and performs backward pumping-type Raman amplification.

The node 510 is a relay node provided in each node (the transceiving nodes 110a and 110b or the Add/Drop nodes 120-1 to 120-n) of the communication system 100A shown in FIG. 10 or between the nodes, for example. The node 510 may be a node that forms a communication system of another topology. In the diagram, a case in which the nodes 510a and 510b are Add/Drop nodes is shown. Due to this, a case in which the node 510*a* is connected to another node adjacent in a different direction from the node 510*b* by the MCF 600 is shown. The node 510*a* may not be connected to another node adjacent in a different direction. Similarly, the diagram shows a case in which the node 510*b* is connected to anther node adjacent in a different direction from the node 510*a* by the MCF 600. The node 510*b* may not be connected to another node adjacent in a different direction.

The MCF 600 has n cores 601, n being an integer of 1 or more. The n cores 601 will be referred to as cores 601-1 to 601-*n*. In the diagram, a case of n=4 is shown. The cores 601-1 and 601-2 transmit optical signals in a first direction (a direction from the node 510*a* to the node 510*b*). The cores 601-3 and 601-4 transmit optical signals in a second direction (a direction from the node 510*b* to the node 510*a*) opposite to the first direction.

The node 510 includes amplification lasers 710, amplification connectors 720 (an amplification light input unit), and an MCF connector 730. Although the node 510 includes one amplification connector 720 on both sides of the MCF connector 730 in the diagram, the amplification connector 720 may be provided on one side.

The amplification laser 710 outputs an amplification laser beam which is amplification light.

The amplification connector 720 relays an optical signal input from the core 601 of the MCF 600 to the MCF connector 730 and relays an optical signal input from the MCF connector 730 to the core 601 of the MCF 600. Moreover, the amplification connector 720 couples an amplification laser beam output from the amplification laser 710 to a reception core using an optical coupler 722 (an amplification light coupling unit). The reception core is the core 601 that transmits an optical signal in a direction from another node to the subject node. A transmission core is the core 601 that transmits an optical signal in a direction from the subject node to another node.

The MCF connector 730 drops an optical signal transmitted through the core 601 allocated to the subject node among the optical signals input from the amplification connector 720. The MCF connector 730 relays an optical signal transmitted through another core 601 to the other amplification connector 720. Moreover, the MCF connector 730 adds an optical signal to be transmitted through the core 601 allocated to the subject node to the amplification connector 720. When the node 510 is a relay node, the MCF connector 730 relays all optical signals transmitted through the core 601 between one amplification connector 720 and the other amplification connector 720.

In the following description, the amplification connector 720 provided on a side opposite to the node 510*b* among the two amplification connectors 720 included in the node 510*a* will be referred to as an amplification connector 720*a*-1. The amplification connector 720 provided on the side of the node 510*b* will be referred to as an amplification connector 720*a*-2. Moreover, the amplification laser 710 and the MCF connector 730 included in the node 510*a* will be referred to as an amplification laser 710*a* and an MCF connector 730*a*, respectively.

Moreover, the amplification connector 720 provided on the side of the node 510*a* among the two amplification connectors 720 included in the node 510*b* will be referred to as an amplification connector 720*b*-1. The amplification connector 720 provided on a side different from the side of the node 510*a* will be referred to as an amplification connector 720*b*-2. Moreover, the amplification laser 710 and the MCF connector 730 included in the node 510*b* are referred to as an amplification laser 710*b* and a MCF connector 730*b*, respectively.

In the node 510*a*, the MCF 600 between the subject node and another node on the opposite side of the node 510*b* will be referred to as an MCF 600-1. The MCF 600 between the node 510*a* and the node 510*b* will be referred to as an MCF 600-2. In the node 510*b*, the MCF 600 between the subject node and another node on the opposite side of the node 510*a* will be referred to as an MCF 600-3.

Figure 13:
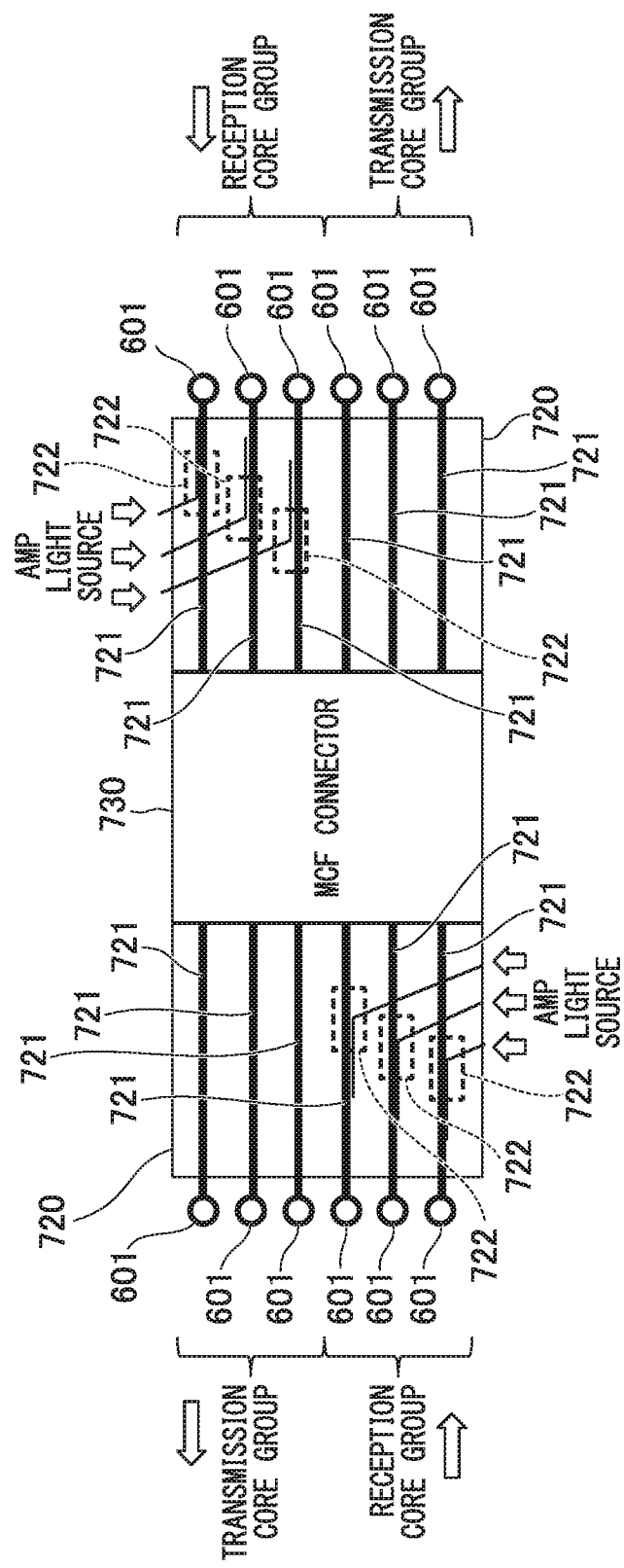
FIG. 13 is a diagram showing a configuration example of an amplification connector according to the first embodiment.

FIG. 13 is a diagram showing a configuration example of the amplification connector 720 that performs Raman amplification. In the drawing, the MCF 600 has six cores 601. Moreover, a case in which three transmission cores and three reception cores are present is shown as an example.

The amplification connector 720 includes a plurality of optical transmission paths 721 and one or more optical couplers 722. Each of the optical transmission paths 721 of the amplification connector 720 is connected to one core 601. The optical transmission path 721 relays an optical signal input from the core 601 to the MCF connector 730 and relays an optical signal input from the MCF connector 730 to the core 601. In the following description, the optical transmission path 721 connected to the core 601-*i* of the MCF 600 will be referred to as an optical transmission path 721-*i*, i being an integer of 1 or more.

The optical coupler 722 is provided in the optical transmission path 721 connected to the core 601 of a reception core group. The amplification connector 720 inputs an amplification laser beam output by the amplification laser 710 as an AMP (amplification) light source to the core 601 of the reception core group. The optical coupler 722 couples the input amplification laser beam in a direction opposite to a signal transmission direction and performs backward pumping on an optical signal transmitted to the core 601. In the case of forward pumping, the optical coupler 722 couples an amplification laser beam to the core 601 of the transmission core group.

Although the amplification laser beam is input to each of the optical transmission paths 721 connected to the amplification target cores 601, the number of amplification lasers 710 serving as the light source of an amplification laser beam may not be the same as the number of amplification target cores 601. When the number of amplification lasers 710 is smaller than the number of amplification target cores 601, the amplification laser beam output from the amplification laser 710 is split and the split amplification laser beams are input to the amplification connector 720. When the number of amplification lasers 710 is larger than the number of amplification target cores 601, the amplification laser beams output from the amplification lasers 710 are combined and the combined amplification laser beam is input to the amplification connector 720. A functional unit that splits or combines laser beams may be provided outside or inside the amplification connector 720.

Next, the operation of the optical amplification system 500 will be described.

First, optical amplification of an optical signal in a first direction will be described.

The amplification connector 720*a*-1 of the node 510*a* inputs an amplification laser beam output by the amplification laser 710*a* to the cores 601-1 and 601-2 of the MCF 600-1 using the optical couplers 722 provided in the optical transmission paths 721-1 and 721-2.

The amplification connector 720*a*-1 relays an optical signal amplified by the amplification laser beam of the amplification laser 710*a* from the cores 601-1 and 601-2 of the MCF 600-1 to the MCF connector 730a using the optical transmission paths 721-1 and 721-2.

The MCF connector 730a drops an optical signal of the optical transmission path 721 connected to the core 601 that transmits an optical signal from the other node to the subject node among the optical transmission paths 721-1 and 721-2 of the amplification connector 720a-1. The MCF connector 730a relays an optical signal of the optical transmission path 721 connected to another core 601 to the optical transmission path 721 of the amplification connector 720a-2. Furthermore, the MCF connector 730a adds an optical signal to the optical transmission path 721 connected to the core 601 that transmits an optical signal from the subject node to the other node among the optical transmission paths 721-1 and 721-2 of the amplification connector 720a-2. The amplification connector 720a-2 relays the optical signals input to the optical transmission paths 721-1 and 721-2 to the cores 601-1 and 601-2 of the MCF 600-2.

The amplification connector 720b-1 of the node 510b inputs an amplification laser beam output by the amplification laser 710b to the cores 601-1 and 601-2 of the MCF 600-2 using the optical couplers 722 provided in the optical transmission paths 721-1 and 721-2.

The amplification connector 720b-1 relays an optical signal amplified by the amplification laser beam of the amplification laser 710b from the cores 601-1 and 601-2 of the MCF 600-2 to the MCF connector 730b using the optical transmission paths 721-1 and 721-2.

The MCF connector 730b drops an optical signal of the optical transmission path 721 connected to the core 601 that transmits an optical signal from the other node to the subject node among the optical transmission paths 721-1 and 721-2 of the amplification connector 720b-1. The MCF connector 730b relays an optical signal of the optical transmission path 721 connected to another core 601 to the optical transmission path 721 of the amplification connector 720b-2. Furthermore, the MCF connector 730b adds an optical signal to the optical transmission path 721 connected to the core 601 that transmits an optical signal from the subject node to the other node among the optical transmission paths 721-1 and 721-2 of the amplification connector 720b-2. The amplification connector 720b-2 relays the optical signals input to the optical transmission paths 721-1 and 721-2 to the cores 601-1 and 601-2 of the MCF 600-3.

In optical amplification on an optical signal in a second direction, an operation similar to that of the optical amplification on an optical signal in the first direction is performed in a reverse direction.

The amplification connector 720b-2 of the node 510b inputs an amplification laser beam output by the amplification laser 710b to the cores 601-3 and 601-4 of the MCF 600-3 using the optical couplers 722 provided in the optical transmission paths 721-3 and 721-4.

The amplification connector 720b-2 receives and relays an optical signal amplified by the amplification laser beam of the amplification laser 710b from the cores 601-3 and 601-4 of the MCF 600-3 to the MCF connector 730b using the optical transmission paths 721-3 and 721-4.

The MCF connector 730b drops an optical signal of the optical transmission path 721 connected to the core 601 that transmits an optical signal from the other node to the subject node among the optical transmission paths 721-3 and 721-4 of the amplification connector 720b-2. The MCF connector 730b relays an optical signal of the optical transmission path 721 connected to another core 601 to the optical transmission path 721 of the amplification connector 720b-1. Furthermore, the MCF connector 730b adds an optical signal to the optical transmission path 721 connected to the core 601 that transmits an optical signal from the subject node to the other node among the optical transmission paths 721-3 and 721-4 of the amplification connector 720b-1. The amplification connector 720b-1 relays the optical signals input to the optical transmission paths 721-3 and 721-4 to the cores 601-3 and 601-4 of the MCF 600-2.

The amplification connector 720a-2 of the node 510a inputs amplification laser beams output by the amplification lasers 710a to the cores 601-3 and 601-4 of the MCF 600-2 using the optical couplers 722 provided in the optical transmission paths 721-3 and 721-4.

The amplification connector 720a-2 receives and relays optical signals amplified by the amplification laser beams of the amplification lasers 710a from the cores 601-3 and 601-4 of the MCF 600-2 to the MCF connector 730a using the optical transmission paths 721-3 and 721-4.

The MCF connector 730a drops an optical signal of the optical transmission path 721 connected to the core 601 that transmits an optical signal from the other node to the subject node among the optical transmission paths 721-3 and 721-4 of the amplification connector 720a-2. The MCF connector 730a relays an optical signal of the optical transmission path 721 connected to another core 601 to the optical transmission path 721 of the amplification connector 720a-1. Furthermore, the MCF connector 730a adds an optical signal to the optical transmission path 721 connected to the core 601 that transmits an optical signal from the subject node to the other node among the optical transmission paths 721-3 and 721-4 of the amplification connector 720a-1. The amplification connector 720a-1 relays the optical signals input to the optical transmission paths 721-3 and 721-4 to the cores 601-3 and 601-4 of the MCF 600-1.

In the optical amplification system 500 shown in FIG. 12, backward pumping-type Raman amplification is performed in a configuration in which the cores 601-1 and 601-2 of the MCF 600 transmit signals in the first direction and the cores 601-3 and 601-4 transmit signals in the second direction. Forward pumping-type Raman amplification can be performed by transmitting signals in the same direction as the direction of the amplification laser beam.

Although a configuration in which two amplification connectors 720 are used in one node is employed, if the MCF connector 730 is able to relay an amplification laser beam, the connector may be configured such that one amplification connector 720 propagates an amplification laser beam in both directions.

Moreover, although light is input directly from the amplification connector 720 to the MCF 600, the amplification connector 720 may be connected to a highly nonlinear optical fiber or the like appropriate for Raman amplification and then connected to the transmission MCF 600.

Basically, although optical signals of cores may be amplified at a uniform amplification ratio, when a transmission loss or the amount of noise fluctuates depending on a core, the amplification ratios in the cores may be adjusted so that the optical signals after amplification have a constant level.

Moreover, the MCF connector 730 and the amplification connector 720 may be an integrated connector having both functions.

Moreover, the amplification laser 710 may be incorporated into the amplification connector 720. In this case, an electrical signal is input to the amplification connector 720 instead of the amplification laser beam. The amplification laser 710 incorporated into the amplification connector 720 converts an input electrical signal to an amplification laser beam.

Although a case in which the present embodiment is applied to the dual-system two-way communication system 100A shown in FIG. 5 has been described, the present embodiment may be applied to the single-system one-way communication system 100 shown in FIG. 1. When the present embodiment is applied to the communication system 100, the optical amplification system 500 may have a configuration of performing optical amplification in any one of the first and second directions.

Second Embodiment

In a second embodiment, specific node amplification is performed by Raman amplification. In the following description, a difference from the first embodiment will be mainly described.

Figure 14:
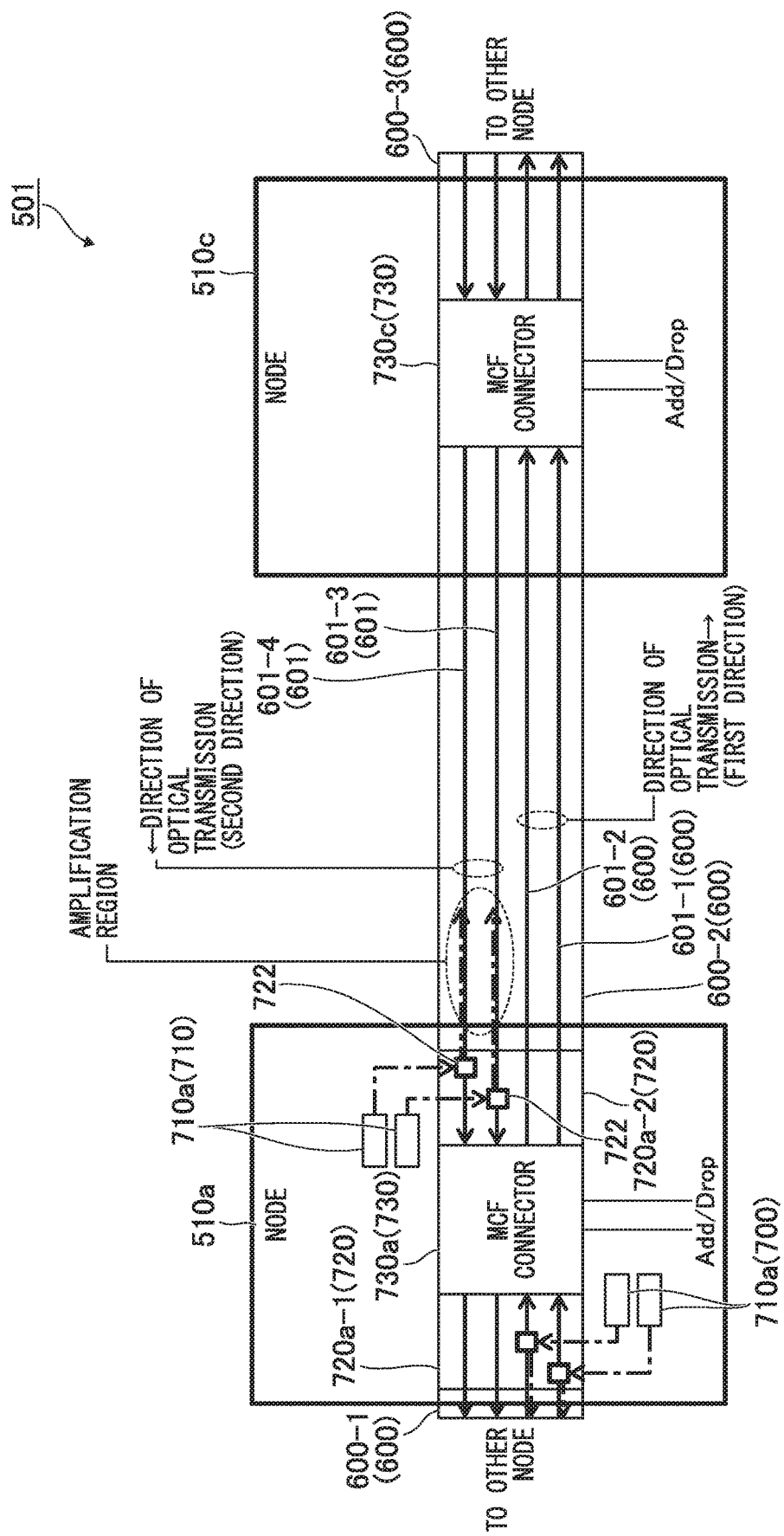
FIG. 14 is a diagram showing a configuration example of an optical amplification system according to a second embodiment.

FIG. 14 is a diagram showing a configuration example of an optical amplification system 501 according to the second embodiment. In the drawing, the same portions as those of the optical amplification system 500 according to the first embodiment shown in FIG. 12 will be denoted by the same reference numerals, and the description thereof will be omitted. The optical amplification system 501 includes a node 510a and a node 510c (nodes) connected together by the MCF 600. The optical amplification system 501 uses cores 601 of the MCF 600 for one-way signal transmission and performs backward pumping-type Raman amplification.

The nodes 510a and 510c are relay nodes provided in each node (the transceiving nodes 110a and 110b or the Add/Drop nodes 120-1 to 120-n) of the communication system 100A shown in FIG. 10 or between the nodes, for example. The nodes 510a and 510c may be nodes that form a communication system of another topology. In the diagram, a case in which the nodes 510a and 510c are Add/Drop nodes is shown. Due to this, a case in which the node 510a is connected to another node adjacent thereto in a direction different from the node 510c by the MCF 600 is shown. The node 510a may not be connected to another node adjacent thereto in a different direction. Similarly, the diagram shows a case in which the node 510c is connected to anther node adjacent thereto in a direction different from the node 510a by the MCF 600. The node 510c may not be connected to another node adjacent thereto in a different direction.

The node 510a is similar to the node 510a of the first embodiment and is a node in which optical amplification is performed. The node 510c is a node in which optical amplification is not performed. The node 510c includes the MCF connector 730 but does not include the amplification laser 710 and the amplification connector 720. Hereinafter, the MCF connector 730 included in the node 510c will be referred to as a MCF connector 730c.

Next, the operation of the optical amplification system 501 will be described.

First, optical amplification on an optical signal in a first direction will be described.

The operation of the node 510a is similar to that of the first embodiment.

When the node 510c is an Add/Drop node, the MCF connector 730c of the node 510c drops an optical signal of the core 601 that transmits an optical signal from the other node to the subject node among the cores 601-1 and 601-2 of the MCF 600-2. The MCF connector 730c relays an optical signal of the other core 601 to the corresponding core 601 of the MCF 600-3. Furthermore, the MCF connector 730c adds an optical signal to the core 601 that transmits an optical signal from the subject node to the other node among the cores 601-1 and 601-2 of the MCF 600-2. The cores 601-1 and 601-2 of the MCF 600-3 transmit an optical signal relayed from the MCF 600-2 and an optical signal added by the node 510c. When the node 510c is a relay node, the MCF connector 730c performs relaying the optical signals transmitted through the cores 601 of the MCFs 600-2 and 600-3.

Next, optical amplification on an optical signal in a second direction will be described.

When the node 510c is an Add/Drop node, the MCF connector 730c of the node 510c drops an optical signal of the core 601 that transmits an optical signal from the other node to the subject node among the optical signals transmitted through the cores 601-3 and 601-4 of the MCF 600-3. The MCF connector 730c relays the optical signal of the other core 601 to a corresponding core 601 of the MCF 600-2. Furthermore, the MCF connector 730c adds an optical signal to a core 601 that transmits an optical signal from the subject node to the other node among the cores 601-3 and 601-4 of the MCF 600-2. The cores 601-3 and 601-4 of the MCF 600-2 transmit the optical signal relayed from the MCF 600-3 and the optical signal added by the node 510c. When the node 510c is a relay node, the MCF connector 730c performs relaying the optical signals transmitted through the cores 601 of the MCFs 600-2 and 600-3.

The operation of the node 510a is similar to that of the first embodiment.

In the optical amplification system 501 shown in FIG. 14, backward pumping-type Raman amplification is performed in a configuration in which the cores 601-1 and 601-2 of the MCF 600 transmit signals in the first direction and the cores 601-3 and 601-4 transmit signals in the second direction. Forward pumping-type Raman amplification can be performed by transmitting signals in the same direction as the direction of the amplification laser beam.

An amplification ratio may be increased according to a transmission distance in order to suppress a fluctuation in a transmission loss generated due to a difference in transmission distance of optical signals transmitted through cores. Similarly to the first embodiment, uniform amplification may be performed at each core.

Although the amplification connector 720 includes the same number of amplification lasers 710 as the number of amplification target cores 601, the amplification connector 720 may include a number of amplification lasers 710 smaller than the number of amplification target cores 601. In this case, the amplification laser beam output by the amplification laser 710 is combined or split and the combined or split amplification laser beam is input to the amplification connector 720. When an amplification ratio is changed depending on a core, the ratio of combination or splitting is adjusted. A functional unit that splits or combines laser beams may be provided outside or inside the amplification connector 720.

Although a case in which the present embodiment is applied to the single-system two-way communication system 100A shown in FIG. 5 has been described, the present embodiment may be applied to the single-system one-way communication system 100 shown in FIG. 1. When the present embodiment is applied to the communication system 100, the optical amplification system 501 may have a configuration of performing optical amplification in any one of the first and second directions.

Third Embodiment

In a third embodiment, a specific node amplifies the optical signals of a plurality of cores collectively by EDFA.

Figure 15:
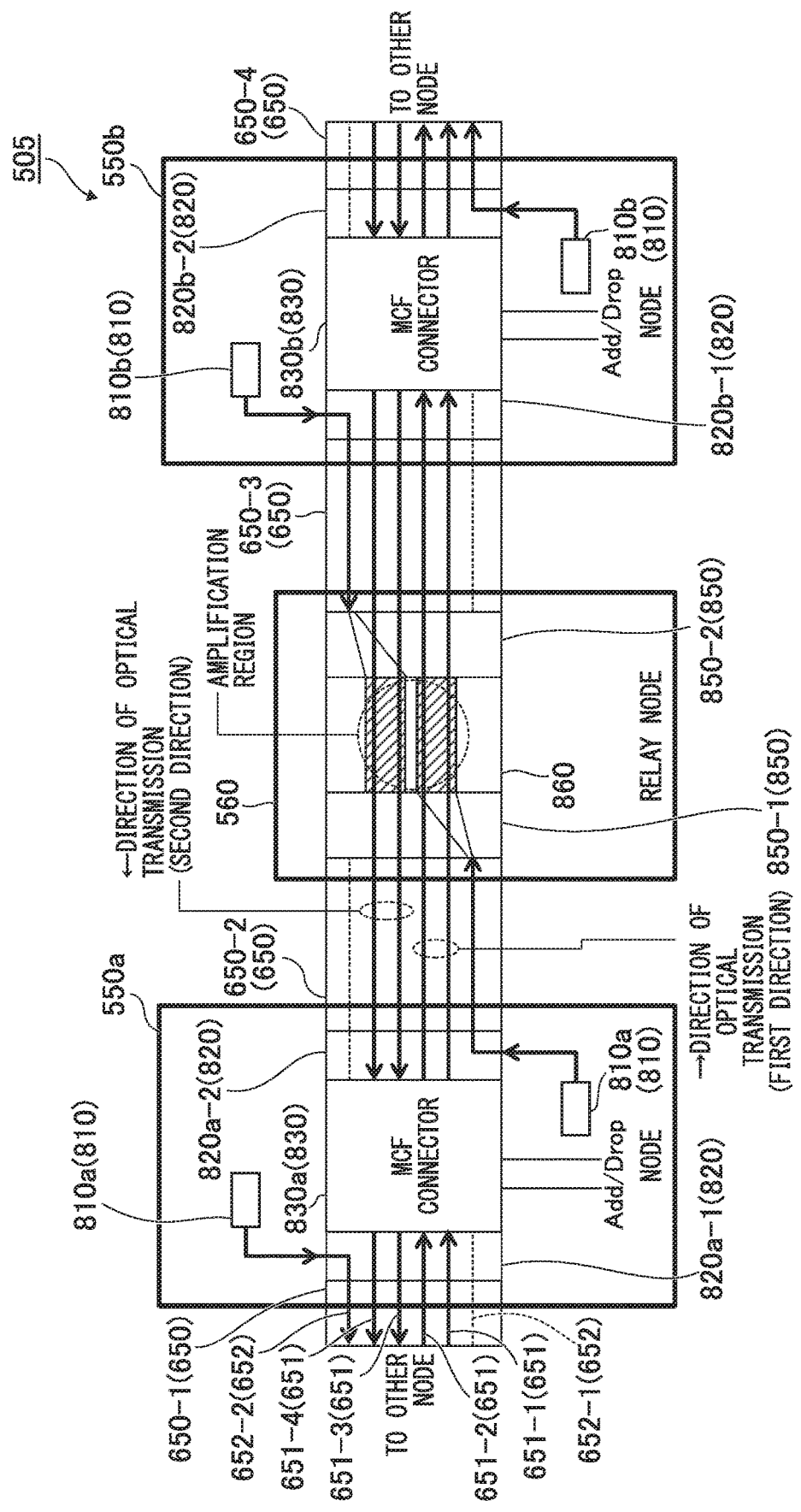
FIG. 15 is a diagram showing a configuration example of an optical amplification system according to a third embodiment.

FIG. 15 is a diagram showing a configuration example of an optical amplification system 505 according to the third embodiment. The optical amplification system 505 includes a node 550a (a node), a relay node 560, and a node 550b (a node). The node 550a and the relay node 560 are connected together by an MCF 650 and the relay node 560 and the node 550b are connected together by the MCF 650. The MCF 650 includes signal transmission cores 651 and remote excitation cores 652. Hereinafter, the node 550a and the node 550b will be collectively referred to as a node 550. The optical amplification system 505 uses the signal transmission cores 651 of the MCF 650 for one-way signal transmission. Moreover, the optical amplification system 505 uses forward pumping-type EDFA in optical amplification. In the optical amplification system 505, remote excitation light from the node 550 propagates to the relay node 560 through the remote excitation core 652 of the MCF 650. The relay node 560 performs amplification of optical signals in both directions using the remote excitation light propagating from the node 550. The relay node 560 includes a multi-core EDFA (MC-EDFA) having a double-cladding structure in an amplification medium.

The node 550 is a relay node provided in each node (the transceiving nodes 110a and 110b or the Add/Drop nodes 120-1 to 120-n) of the communication system 100A shown in FIG. 10 or between the nodes, for example. The node 550 may be a node that forms a communication system of another topology. In the diagram, a case in which the nodes 550a and 550b are Add/Drop nodes is shown. Due to this, a case in which the node 550a is connected to another node adjacent thereto in a direction different from the relay node 560 by the MCF 650 is shown. The node 550a may not be connected to another node adjacent thereto in a different direction. The diagram shows a case in which the node 550b is connected to anther node adjacent thereto in a direction different from the relay node 560 by the MCF 650. The node 550b may not be connected to another node adjacent thereto in a different direction.

The light source for optical amplification is an active component which is relatively fragile. When an excitation laser is disposed in a relay node and the excitation laser is broken, a mechanic has to go and repair the relay node. In the third embodiment, since the light source of optical amplification is disposed in the node 550a and 550b which are Add/Drop nodes, it is possible to reduce the number of fault handling locations.

The MCF 650 has n signal transmission cores 651 for optical signal transmission and m remote excitation cores 652 for transmitting a remote excitation laser beam, n and m being integers of 1 or more. The respective n signal transmission cores 651 will be referred to as signal transmission cores 651-1 to 651-n. The respective m remote excitation cores 652 will be referred to as remote excitation cores 652-1 to 652-m. The diagram shows a case in which n=4 and m=2. The signal transmission cores 651-1 and 651-2 transmit optical signals in a first direction (the direction from the node 550a to the node 550b). The signal transmission cores 651-3 and 651-4 transmit optical signals in a second direction (the direction from the node 550b to the node 550a) opposite to the first direction.

The node 550 includes remote excitation lasers 810, a remote excitation connectors 820 (an amplification light input unit), and a MCF connector 830. In the diagram, although the relay node 560 includes the remote excitation connectors 820 on both sides of the MCF connector 830, the remote excitation connector 820 may be provided on one side.

The remote excitation laser 810 outputs a remote excitation laser beam which is a remote excitation light.

The remote excitation connector 820 relays optical signals input from the signal transmission cores 651 of the MCF 650 to the MCF connector 830. The remote excitation connector 820 relays optical signals input from the MCF connector 830 to the signal transmission cores 651 of the MCF 650. Furthermore, the remote excitation connector 820 adds a remote excitation laser beam output by the remote excitation laser 810 to the remote excitation core 652 of the MCF 650.

The MCF connector 830 drops an optical signal transmitted through the signal transmission core 651 that transmits an optical signal from the other node to the subject node among the optical signals input from the remote excitation connector 820. The MCF connector 830 relays an optical signal transmitted through another signal transmission core 651 to the other remote excitation connector 820. Moreover, the MCF connector 830 adds an optical signal to be transmitted through the signal transmission core 651 that transmits an optical signal from the subject node to the other node to the remote excitation connector 820. When the node 550 is a relay node, the MCF connector 830 relays all optical signals transmitted through the signal transmission core 651.

The relay node 560 includes amplification connectors 850 (amplification light coupling units) and an MC-EDFA 860 (an amplification unit). In the diagram, the relay node 560 includes the amplification connectors 850 on both sides of the MC-EDFA 860. When a remote excitation laser beam is transmitted from one side only, the relay node 560 may include the amplification connector 850 on the reception side of the remote excitation laser beam.

The amplification connector 850 relays an optical signal transmitted through the signal transmission core 651 of the MCF 650 to the MC-EDFA 860. The amplification connector 850 inputs a remote excitation laser beam transmitted through the remote excitation core 652 to the MC-EDFA 860 as a remote excitation light. Moreover, the amplification connector 850 relays an optical signal output from the MC-EDFA 860 to the signal transmission core 651 of the MCF 650.

The MC-EDFA 860 amplifies optical signals input from one amplification connector 850 using a remote excitation laser beam and outputs the amplified optical signals to the other amplification connector 850.

Hereinafter, the remote excitation connector 820 provided on a side opposite to the relay node 560 among the two remote excitation connectors 820 included in the node 550a will be referred to as a remote excitation connector 820a-1. The remote excitation connector 820 provided on the side of the relay node 560 will be referred to as a remote excitation connector 820a-2. Moreover, the MCF connector 830 and the remote excitation laser 810 provided in the node 550a will be referred to as a MCF connector 830a and a remote excitation laser 810a.

Moreover, the remote excitation connector 820 provided on the side of the relay node 560 among the two remote excitation connectors 820 included in the node 550b will be referred to as a remote excitation connector 820b-1. The remote excitation connector 820 provided on the opposite side of the relay node 560 will be referred to as a remote excitation connector 820b-2. Moreover, the MCF connector 830 and the remote excitation laser 810 included in the node 550b will be referred to as a MCF connector 830b and a remote excitation laser 810b.

Moreover, the amplification connector 850 provided on the side of the node 550a among the two amplification connectors 850 included in the relay node 560 will be referred to as an amplification connector 850-1. The amplification connector 850 provided on the side of the node 550*b* will be referred to as an amplification connector 850-2.

Moreover, the MCF 650 between the node 550*a* and the other node on the opposite side of the relay node 560 among the two MCFs 650 connected to the node 550*a* will be referred to as an MCF 650-1. The MCF 650 between the node 550*a* and the relay node 560 will be referred to as an MCF 650-2. The MCF 650 between the relay node 560 and the node 550*b* will be referred to as an MCF 650-3. The MCF 650 between the node 550*b* and the other node on the opposite side of the relay node 560 among the two MCFs 650 connected to the node 550*b* will be referred to as an MCF 650-4.

Figure 16:
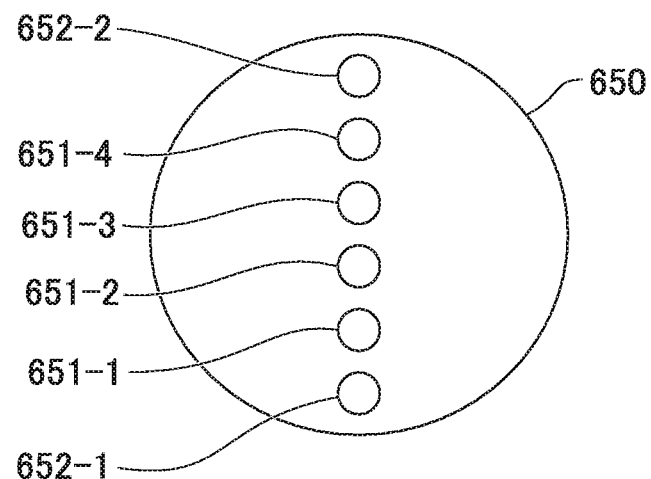
FIG. 16 is a cross-sectional view showing an MCF according to the third embodiment.

FIG. 16 is a cross-sectional view showing the MCF 650. In the diagram, four signal transmission cores 651-1 to 651-4 and two remote excitation cores 652-1 to 652-2 of the MCF 650 are arranged in a line. The remote excitation cores 652-1 and 652-2 are disposed on the outermost side. A core arrangement is arbitrary. Moreover, when the wavelength of an optical signal is different from the wavelength of a remote excitation laser beam, the optical signal and the remote excitation laser beam may be transmitted using the same core. In this case, for the remote excitation connector 820 to add a remote excitation laser beam to the signal transmission core 651, the remote excitation connector 820 and the amplification connector 850 need to combine and split signals having a specific wavelength.

Figure 17:
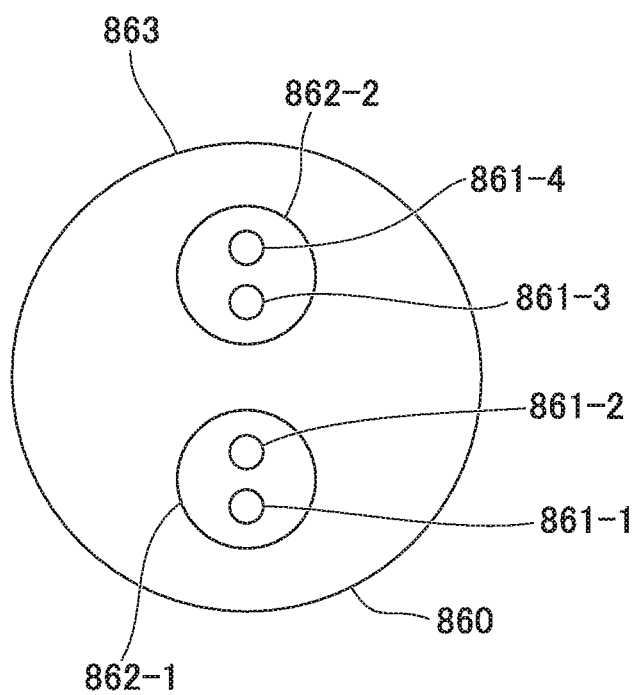
FIG. 17 is a cross-sectional view showing MC-EDFA according to the third embodiment.

FIG. 17 is a cross-sectional view showing the MC-EDFA 860. The MC-EDFA 860 has a double-cladding structure. In the MC-EDFA 860, a plurality of cores 861 are grouped by being arranged in one first cladding portion 862 collectively. The first cladding portion 862 is one cladding region, and the MC-EDFA 860 has one or more first cladding portions 862. A second cladding portion 863 on the outer side of the first cladding portion 862 is a cladding portion having a lower refractive index than the first cladding portion 862. A core 861 corresponding to the signal transmission core 651-*i* of the MCF 650 will be referred to as a core 861-*i*. The first cladding portion 862 including the cores 861-1 and 861-2 will be referred to as a first cladding portion 862-1. The first cladding portion 862 including the cores 861-3 and 861-4 will be referred to as a first cladding portion 862-2. When a remote excitation laser beam propagates through the first cladding portion 862, optical signals of the plurality of cores 861 disposed in the first cladding portion 862 are amplified collectively. The amplification ratios in the respective cores 861 disposed in the same first cladding portion 862 are approximately the same.

Figure 18:
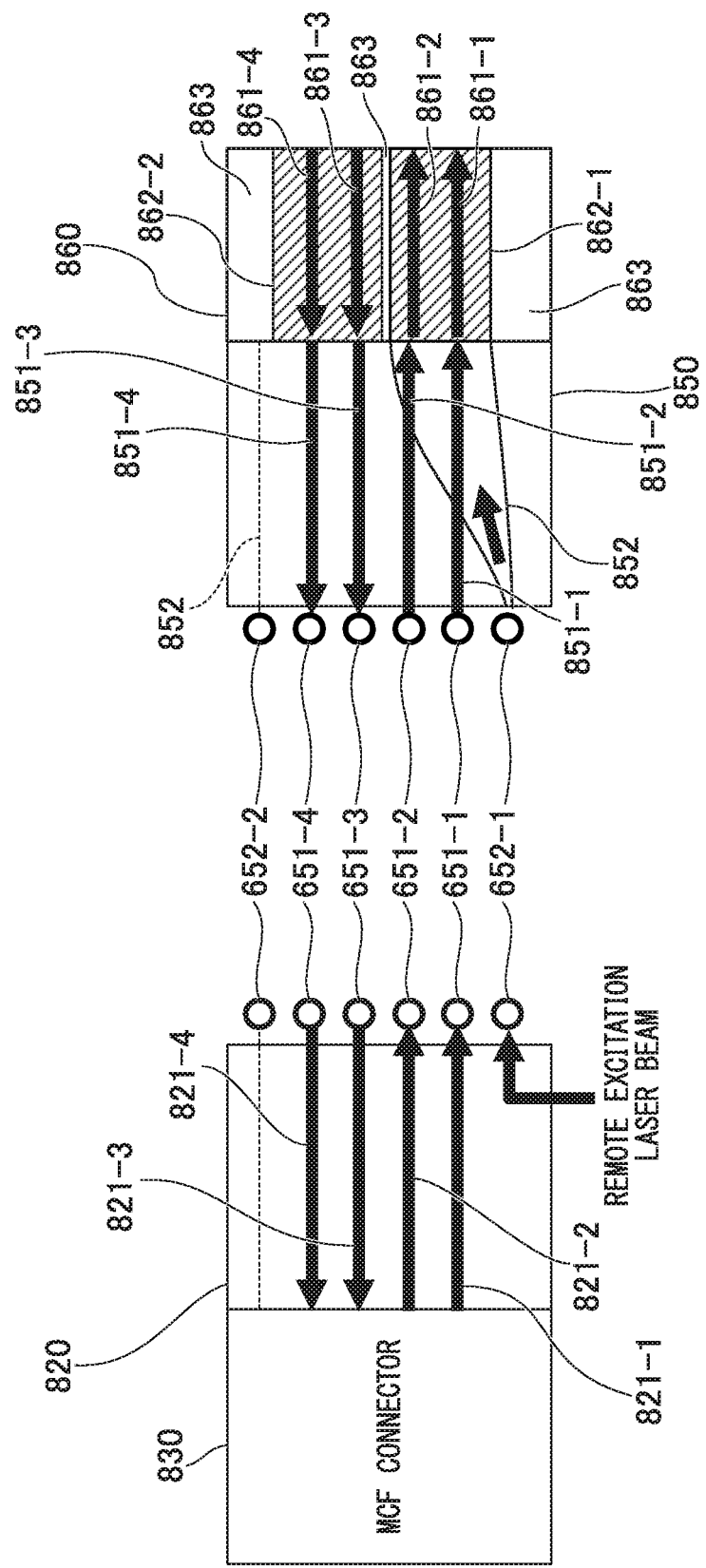
FIG. 18 is a diagram showing a configuration example of a remote excitation connector and an amplification connector according to the third embodiment.

FIG. 18 is a diagram showing a configuration example of the remote excitation connector 820 and the amplification connector 850.

The remote excitation connector 820 has n optical transmission paths 821 that transmit optical signals. The optical transmission path 821 connected to the signal transmission core 651-*i* of the MCF 650 will be referred to as an optical transmission path 821-*i*. The optical transmission path 821 relays optical signals input from the signal transmission cores 651 to the MCF connector 830 and relays optical signals input from the MCF connector 830 to the signal transmission cores 651. Furthermore, the remote excitation connector 820 adds a remote excitation laser beam output by the remote excitation laser 810 to the remote excitation core 652 of the MCF 650. In the diagram, the remote excitation connector 820 adds a remote excitation laser beam to the remote excitation core 652-1.

The amplification connector 850 has n optical transmission paths 851 for transmitting optical signals and an optical transmission path 852 for transmitting a remote excitation laser beam. The optical transmission path 851 connected to the signal transmission core 651-*i* of the MCF 650 and the core 861-*i* of the MC-EDFA 860 will be referred to as an optical transmission path 851-*i*. The optical transmission path 852 inputs a remote excitation laser beam transmitted through the remote excitation core 652 to the first cladding portion 862 of the MC-EDFA 860.

Next, the operation of the optical amplification system 505 shown in FIG. 15 will be described.

First, optical amplification of an optical signal in a first direction will be described.

The remote excitation connector 820*a*-1 of the node 550*a* relays an optical signal transmitted through the signal transmission cores 651-1 and 651-2 of the MCF 650-1 to the MCF connector 830*a* through the optical transmission paths 821-1 and 821-2. The MCF connector 830*a* drops an optical signal of the optical transmission path 821 connected to the signal transmission core 651 that transmits an optical signal from the other node to the subject node among the optical transmission paths 821-1 and 821-2 of the remote excitation connector 820*a*-1. The MCF connector 830*a* relays an optical signal of the optical transmission path 821 connected to another signal transmission core 651 to the optical transmission path 821 of the remote excitation connector 820*a*-2. Furthermore, the MCF connector 830*a* adds an optical signal to the optical transmission path 821 connected to the signal transmission core 651 that transmits an optical signal from the subject node to the other node among the optical transmission paths 821-1 and 821-2 of the remote excitation connector 820*a*-2.

The remote excitation connector 820*a*-2 relays the optical signals input to the optical transmission paths 821-1 and 821-2 to the signal transmission cores 651-1 and 651-2 of the MCF 650-2. Furthermore, the remote excitation connector 820*a*-2 adds a remote excitation laser beam output by the remote excitation laser 810*a* to the remote excitation core 652-1 of the MCF 650-2.

The amplification connector 850-1 of the relay node 560 inputs optical signals transmitted through the signal transmission cores 651-1 and 651-2 of the MCF 650-2 to the cores 861-1 and 861-2 of the MC-EDFA 860 using the optical transmission paths 851-1 and 851-2. Furthermore, the amplification connector 850-1 inputs a remote excitation laser beam transmitted through the remote excitation core 652-1 of the MCF 650-2 to the first cladding portion 862-1 of the MC-EDFA 860 using the optical transmission path 852.

The optical signals transmitted through the cores 861-1 and 861-2 of the MC-EDFA 860 are amplified by a remote excitation laser beam coupled to the first cladding portion 862-1 by the amplification connector 850-1. The amplification connector 850-2 of the relay node 560 relays amplified optical signals output from the cores 861-1 and 861-2 of the MC-EDFA 860 to the signal transmission cores 651-1 and 651-2 of the MCF 650-3 using the optical transmission paths 851-1 and 851-2.

The remote excitation connector 820*b*-1 of the node 550*b* relays optical signals transmitted through the signal transmission cores 651-1 and 651-2 of the MCF 650-3 to the MCF connector 830*b* using the optical transmission paths 821-1 and 821-2. The MCF connector 830*b* drops an optical signal of the optical transmission path 821 connected to the signal transmission core 651 that transmits an optical signal from the other node to the subject node among the optical transmission paths 821-1 and 821-2 of the remote excitation connector 820b-1. The MCF connector 830b relays an optical signal of the optical transmission path 821 connected to another signal transmission core 651 to the optical transmission path 821 of the remote excitation connector 820b-2. Furthermore, the MCF connector 830b adds an optical signal to the optical transmission path 821 connected to the signal transmission core 651 that transmits an optical signal from the subject node to the other node among the optical transmission paths 821-1 and 821-2 of the remote excitation connector 820b-2.

The remote excitation connector 820b-2 relays the optical signals input to the optical transmission paths 821-1 and 821-2 to the signal transmission cores 651-1 and 651-2 of the MCF 650-4. Furthermore, the remote excitation connector 820b-2 adds a remote excitation laser beam output by the remote excitation laser 810b to the remote excitation core 652-1 of the MCF 650-4.

In optical amplification on an optical signal in a second direction, an operation similar to that of the optical amplification on an optical signal in the first direction is performed in a reverse direction.

The remote excitation connector 820b-2 of the node 550b relays optical signals transmitted through the signal transmission cores 651-3 and 651-4 of the MCF 650-4 to the MCF connector 830b using the optical transmission paths 821-3 and 821-4. The MCF connector 830b drops an optical signal of the optical transmission path 821 connected to the signal transmission core 651 that transmits an optical signal from the other node to the subject node among the optical transmission paths 821-3 and 821-4 of the remote excitation connector 820b-2. The MCF connector 830b relays an optical signal of the optical transmission path 821 connected to another signal transmission core 651 to the optical transmission path 821 of the remote excitation connector 820b-1. Furthermore, the MCF connector 830b adds an optical signal to the optical transmission path 821 connected to the signal transmission core 651 that transmits an optical signal from the subject node to the other node among the optical transmission paths 821-3 and 821-4 of the remote excitation connector 820b-1.

The remote excitation connector 820b-1 relays the optical signals input to the optical transmission paths 821-3 and 821-4 to the signal transmission cores 651-3 and 651-4 of the MCF 650-3. Furthermore, the remote excitation connector 820b-1 adds a remote excitation laser beam output by the remote excitation laser 810b to the remote excitation core 652-2 of the MCF 650-3.

The amplification connector 850-2 of the relay node 560 inputs optical signals transmitted through the signal transmission cores 651-3 and 651-4 of the MCF 650-3 to the cores 861-3 and 861-4 of the MC-EDFA 860 using the optical transmission paths 851-3 and 851-4. Furthermore, the amplification connector 850-2 inputs a remote excitation laser beam transmitted through the remote excitation core 652-2 of the MCF 650-3 to the first cladding portion 862-2 of the MC-EDFA 860 using the optical transmission path 852.

The optical signals transmitted through the cores 861-3 and 861-4 of the MC-EDFA 860 are amplified by a remote excitation laser beam coupled to the first cladding portion 862-2 by the amplification connector 850-2. The amplification connector 850-1 of the relay node 560 relays amplified optical signals output from the cores 861-3 and 861-4 of the MC-EDFA 860 to the signal transmission cores 651-3 and 651-4 of the MCF 650-2 using the optical transmission paths 851-3 and 851-4.

The remote excitation connector 820a-2 of the node 550a relays optical signals transmitted through the signal transmission cores 651-3 and 651-4 of the MCF 650-2 to the MCF connector 830a using the optical transmission paths 821-3 and 821-4. The MCF connector 830a drops an optical signal of the optical transmission path 821 connected to the signal transmission core 651 that transmits an optical signal from the other node to the subject node among the optical transmission paths 821-3 and 821-4 of the remote excitation connector 820a-2. The MCF connector 830a relays an optical signal of the optical transmission path 821 connected to another signal transmission core 651 to the optical transmission path 821 of the remote excitation connector 820a-1. Furthermore, the MCF connector 830a adds an optical signal to the optical transmission path 821 connected to the signal transmission core 651 that transmits an optical signal from the subject node to the other node among the optical transmission paths 821-3 and 821-4 of the remote excitation connector 820a-1.

The remote excitation connector 820a-1 relays the optical signals input to the optical transmission paths 821-3 and 821-4 to the signal transmission cores 651-3 and 651-4 of the MCF 650-1. Furthermore, the remote excitation connector 820a-1 adds a remote excitation laser beam output by the remote excitation laser 810a to the remote excitation core 652-2 of the MCF 650-1.

In the optical amplification system 505 shown in FIG. 15, although the case of forward pumping has been described, backward pumping may be performed by coupling a remote excitation light with an optical signal in a direction opposite to the signal transmission direction. Moreover, forward pumping and backward pumping may be combined.

Moreover, although the amplification connectors 850 are present on both sides of the MC-EDFA 860, signals may be amplified in both directions by one amplification connector 850. For example, remote excitation is performed from the node 550a only. The amplification connector 850 on the side of the node 550a of the relay node 560 couples a remote excitation light to both cladding regions of the first cladding portions 862-1 and 862-2 of the MC-EDFA 860. In this case, an optical signal in the first direction is subjected to forward pumping, and an optical signal in the second direction is subjected to backward pumping.

Moreover, the remote excitation connector 820 and the MCF connector 830 may be an integrated connector having the functions of both.

Moreover, the remote excitation connector 820 may incorporate the remote excitation laser 810 therein. In this case, an electrical signal is input to the remote excitation connector 820 instead of the amplification laser beam. The remote excitation laser 810 incorporated in the remote excitation connector 820 converts an input electrical signal to a remote excitation laser beam.

Although the amplification connector 850 couples a remote excitation laser beam transmitted through one remote excitation core 652 to one first cladding portion 862 of the MC-EDFA 860, the remote excitation core 652 and the first cladding portion 862 may not in an one-to-one relation. That is, a remote excitation laser beam transmitted from one remote excitation core 652 may be coupled to a plurality of first cladding portions 862. Moreover, remote excitation laser beams transmitted through a plurality of remote excitation cores 652 may be coupled to one first cladding portion 862.

Moreover, a remote excitation laser beam may be coupled to all first cladding portions 862 of the MC-EDFA 860 and may be coupled to partial first cladding portions 862.

Moreover, when the MC-EDFA 860 and the remote excitation laser 810 are present in the same node, an integrated connector having the functions of both the remote excitation connector 820 and the amplification connector 850 may be used.

In the above-described example, although the amplification connector 850 and the MC-EDFA 860 are provided in the relay node, the amplification connector 850 and the MC-EDFA 860 may be provided in the Add/Drop node. In this case, in the Add/Drop node, the remote excitation connector 820 and the amplification connector 850 are connected together directly.

Although a case in which the present embodiment is applied to the single-system two-way communication system 100A shown in FIG. 5 has been described, the present embodiment may be applied to the single-system one-way communication system 100 shown in FIG. 1. When the present embodiment is applied to the communication system 100, the optical amplification system 505 may have a configuration of performing optical amplification in any one of the first and second directions.

Fourth Embodiment

In a fourth embodiment, a specific node amplifies optical signals of individual cores by EDFA. In the following description, a difference from the third embodiment will be mainly described.

Figure 19:
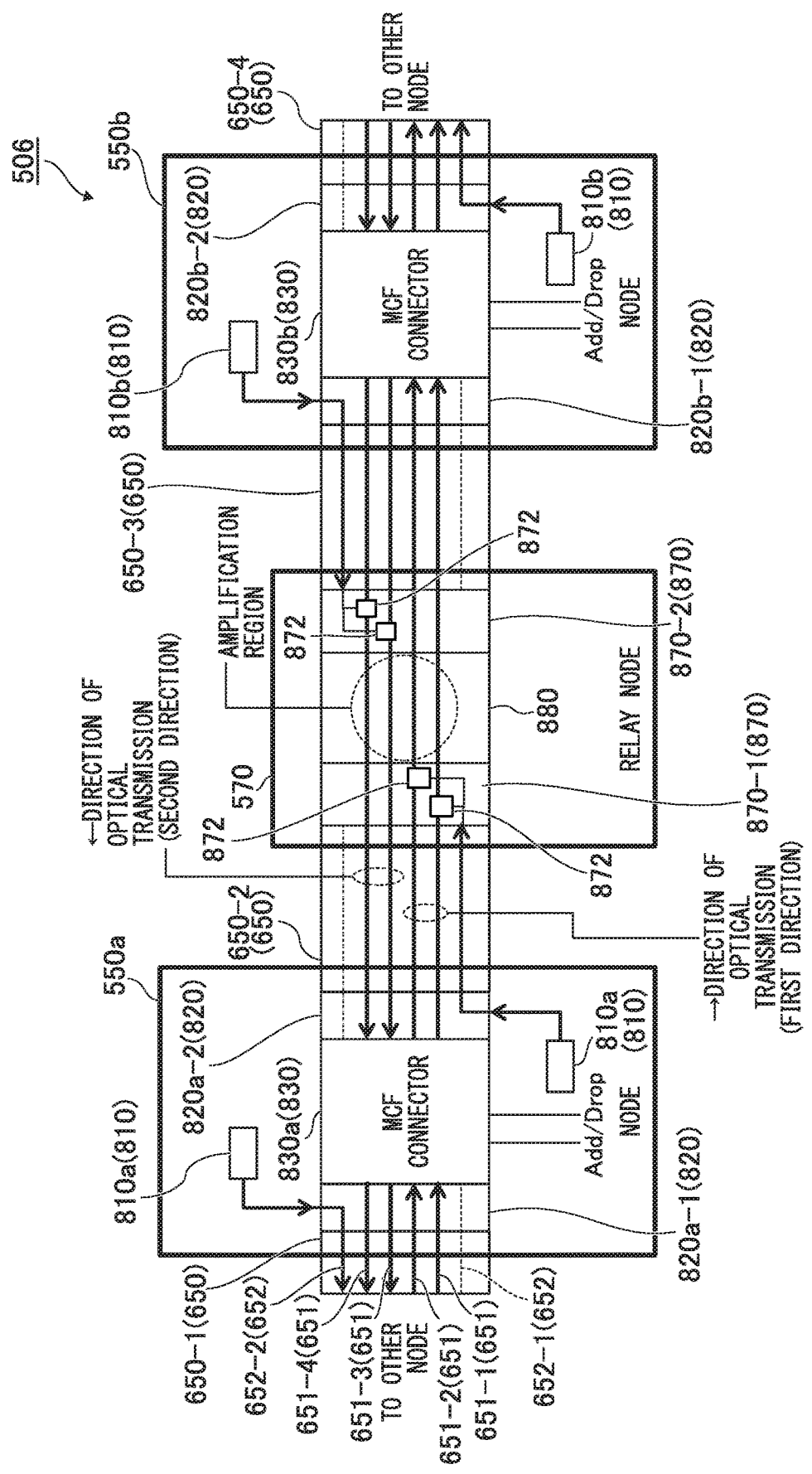
FIG. 19 is a diagram showing a configuration example of an optical amplification system according to a fourth embodiment.

FIG. 19 is a diagram showing a configuration example of an optical amplification system 506 according to the fourth embodiment. In the drawing, the same portions as those of the optical amplification system 505 according to the third embodiment shown in FIG. 15 will be denoted by the same reference numerals, and the description thereof will be omitted. The optical amplification system 506 shown in the drawing is different from the optical amplification system 505 shown in FIG. 15 in that the optical amplification system 506 includes a relay node 570 instead of the relay node 560. In the optical amplification system 506, a remote excitation light from the node 550 propagates through a remote excitation core 652 of the MCF 650. In the relay node 570 between the node 550a and the node 550b, optical signals in both directions are amplified by the remote excitation light propagating from the node 550. The relay node 570 includes a multi-core EDFA (MC-EDFA) as an amplification medium. In MC-EDFA, an amplification light and an optical signal propagate through the same core, it is possible to amplify a specific core.

Since the light source of optical amplification which is a relatively easily breakable active component is disposed in the nodes 550a and 550b which are Add/Drop nodes, it is possible to reduce the number of fault handling locations.

The relay node 570 includes amplification connectors 870 (coupling units) and an MC-EDFA 880 (an optical fiber amplifier). In the diagram, the relay node 570 includes the amplification connectors 870 on both sides of the MC-EDFA 880. When a remote excitation laser beam is transmitted from one side only, the relay node 570 may include the amplification connector 870 on the reception side of a remote excitation laser beam.

The amplification connector 870 relays optical signals transmitted through the signal transmission cores 651 of the MCF 650 to the MC-EDFA 880 and relays optical signals output from the MC-EDFA 880 to the signal transmission cores of the MCF 650. The amplification connector 870 drops a remote excitation laser beam transmitted through the remote excitation core 652. The optical coupler 872 of the amplification connector 870 couples the dropped remote excitation laser beam to a core that transmits an optical signal in the MC-EDFA 880 as a remote excitation light.

The MC-EDFA 880 inputs the optical signals input from one amplification connector 870 to the other amplification connector 870. The MC-EDFA 880 amplifies the optical signal using the remote excitation laser beam coupled to the core that transmits the optical signal.

When the wavelength of the optical signal is different from the wavelength of the remote excitation laser beam, signal transmission and remote excitation may be performed in the same core. In this case, for the remote excitation connector 820 to add a remote excitation laser beam to the signal transmission core 651, the remote excitation connector 820 and the amplification connector 870 need to combine and split signals having a specific wavelength. However, when the remote excitation laser beam coupled to one core of the MCF is used for amplification of the same core in the MC-EDFA 880, extraction in the amplification connector 870 may be unnecessary. Moreover, when signal transmission and remote excitation are performed in the same core, the remote excitation core 652 of the MCF 650 is not necessary.

Hereinafter, the amplification connector 870 provided on the side of the node 550a among the two amplification connectors 870 included in the relay node 570 will be referred to as an amplification connector 870-1. The amplification connector 870 provided on the side of the node 550b among the two amplification connectors 870 included in the relay node 570 will be referred to as an amplification connector 870-2.

Figure 20:
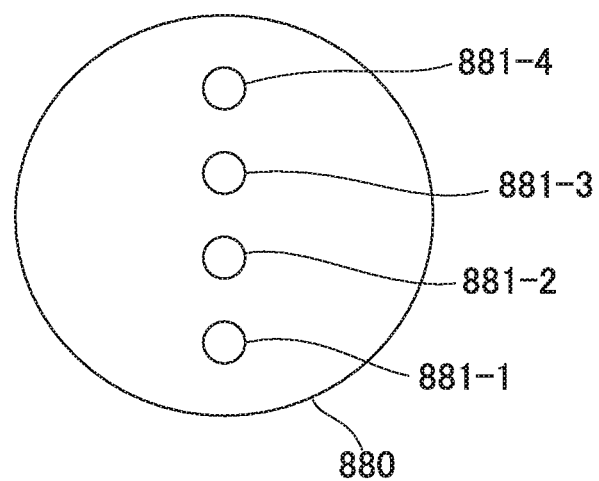
FIG. 20 is a cross-sectional view showing MC-EDFA according to the fourth embodiment.

FIG. 20 is a cross-sectional view showing the MC-EDFA 880. The MC-EDFA 880 includes n cores 881. The core 881 corresponding to the signal transmission core 651-$i$ of the MCF 650 will be referred to a core 881-$i$. An optical signal propagating through the core 881 is amplified by a remote excitation laser beam coupled to the core 881. All cores 881 of the MC-EDFA 880 may be amplified and partial cores 881 of the MC-EDFA 880 may be amplified.

Figure 21:
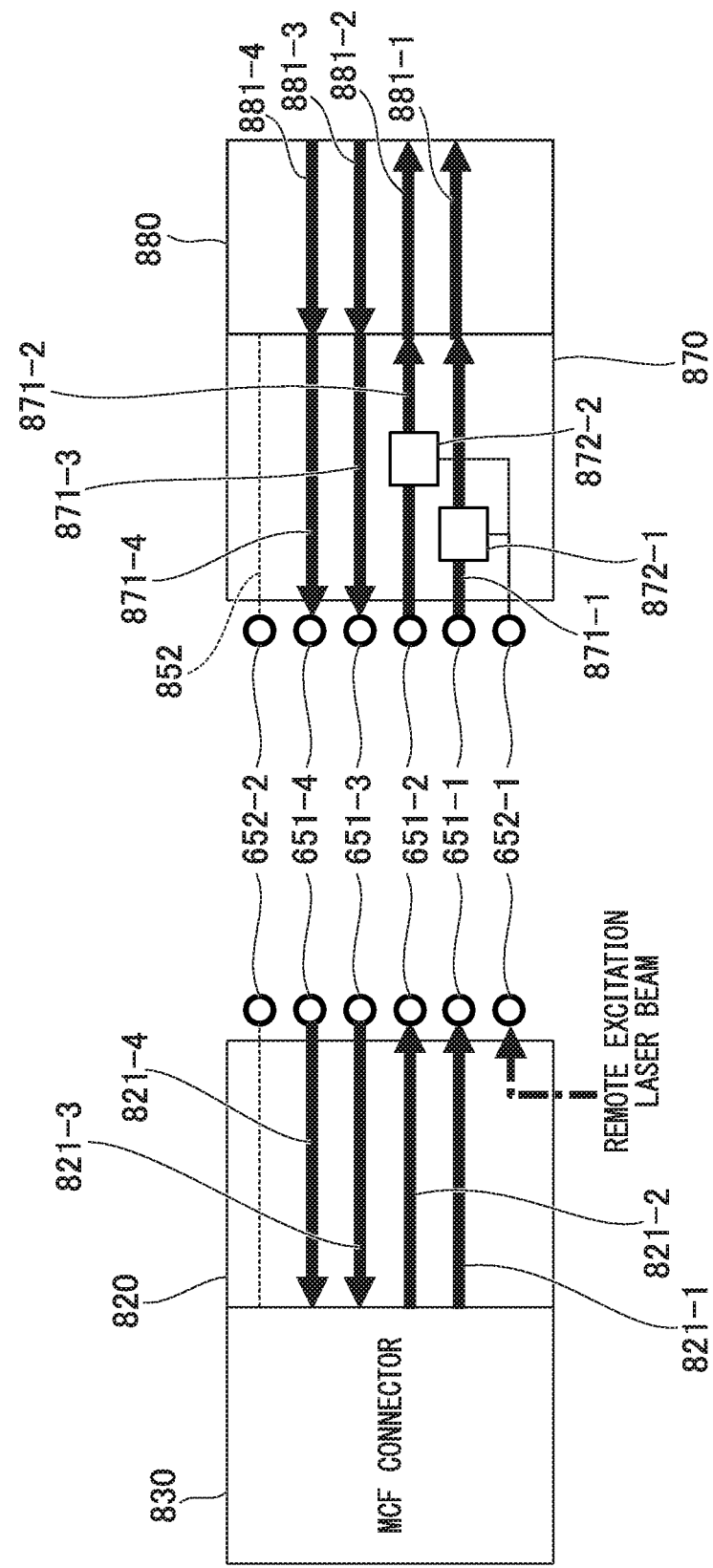
FIG. 21 is a diagram showing a configuration example of an amplification connector according to the fourth embodiment.

FIG. 21 is a diagram showing a configuration example of the amplification connector 870.

The amplification connector 870 includes n optical transmission paths 871 and n or smaller optical couplers 872. The optical transmission path 871 connected to the signal transmission core 651-$i$ of the MCF 650 and the core 881-$i$ of the MC-EDFA 880 will be referred to as an optical transmission path 871-$i$. The optical coupler 872 is provided in the optical transmission path 871. The optical coupler 872 provided in the optical transmission path 871-$i$ will be referred to as an optical coupler 872-$i$. The optical coupler 872-$i$ couples a remote excitation laser beam to the core 881-$i$ of the MC-EDFA 880. The amplification connector 870-1 has an optical coupler 872-1 and an optical coupler 872-2. The optical couplers 872-1 and 872-2 are provided in the optical transmission paths 871-1 and 871-2, respectively. The amplification connector 870-2 has an optical coupler 872-3 and an optical coupler 872-4. The optical couplers 872-3 and 872-4 are provided in the optical transmission paths 871-3 and 871-4, respectively.

Although the amplification connector 870 couples the remote excitation laser beam to a plurality of cores 881 in the MC-EDFA 880, the branching ratio thereof may be changed. For example, in the diagram, although the remote excitation laser beam is branched into two beams and the split beams are coupled to the respective cores 881, the branching ratio may be changed when the amplification ratio of each core is changed. The remote excitation laser beam may be branched equally unless a particular condition is present. Moreover, one remote excitation laser beam may be coupled to one core 881, and a plurality of remote excitation laser beams may be coupled to one core 881. Moreover, when only partial cores 881 of the MC-EDFA 880 are amplified, the amplification connector 870 may not provide the optical coupler 872 in the optical transmission path 871 connected to the core 881 in which amplification is not performed.

Next, the operation of the optical amplification system 506 will be described.

First, optical amplification of an optical signal in a first direction will be described.

The operation of the node 550*a* is similar to that of the third embodiment.

The amplification connector 870-1 of the relay node 570 inputs optical signals transmitted from the node 550*a* through the signal transmission cores 651-1 and 651-2 of the MCF 650-2 to the cores 881-1 and 881-2 of the MC-EDFA 880 using the optical transmission paths 871-1 and 871-2. Furthermore, the amplification connector 870 drops a remote excitation laser beam transmitted through the remote excitation core 652-1 of the MCF 650-2 and inputs the dropped remote excitation laser beam to the optical couplers 872-1 and 872-2. The optical coupler 872-1 couples the remote excitation laser beam to the optical transmission path 871-1 to couple the remote excitation laser beam to the core 881-1 of the MC-EDFA 880. The optical coupler 872-2 couples the remote excitation laser beam to the optical transmission path 871-2 to couple the remote excitation laser beam to the core 881-2 of the MC-EDFA 880.

The optical signals transmitted through the cores 881-1 and 881-2 of the MC-EDFA 880 are amplified by the remote excitation laser beam coupled by the optical couplers 872-1 and 872-2 of the amplification connector 870-1. The amplification connector 870-2 of the relay node 570 relays the amplified optical signals output from the cores 881-1 and 881-2 of the MC-EDFA 880 to the signal transmission cores 651-1 and 651-2 of the MCF 650-3 via the optical transmission paths 871-1 and 871-2.

The operation of the node 550*b* is similar to that of the first embodiment.

In optical amplification on an optical signal in a second direction, an operation similar to that of the optical amplification on an optical signal in the first direction is performed in a reverse direction.

The operation of the node 550*b* is similar to that of the third embodiment.

The amplification connector 870-2 of the relay node 570 inputs optical signals transmitted from the node 550*b* through the signal transmission cores 651-3 and 651-4 of the MCF 650-3 to the cores 881-3 and 881-4 of the MC-EDFA 880 using the optical transmission paths 871-3 and 871-4. Furthermore, the amplification connector 870 drops a remote excitation laser beam transmitted through the remote excitation core 652-2 of the MCF 650-3 and inputs the dropped remote excitation laser beam to the optical couplers 872-3 and 872-4. The optical coupler 872-3 couples the remote excitation laser beam to the optical transmission path 871-3 to couple the remote excitation laser beam to the core 881-3 of the MC-EDFA 880. The optical coupler 872-4 couples the remote excitation laser beam to the optical transmission path 871-4 to couple the remote excitation laser beam to the core 881-4 of the MC-EDFA 880.

The optical signals transmitted through the cores 881-3 and 881-4 of the MC-EDFA 880 are amplified by the remote excitation laser beam coupled by the optical couplers 872-3 and 872-4 of the amplification connector 870-2. The amplification connector 870-1 of the relay node 570 relays the amplified optical signals output from the cores 881-3 and 881-4 of the MC-EDFA 880 to the signal transmission cores 651-3 and 651-4 of the MCF 650-2 by the optical transmission paths 871-3 and 871-4.

The operation of the node 550*a* is similar to that of the third embodiment.

In the optical amplification system 506 shown in FIG. 19, although the case of forward pumping has been described, backward pumping may be performed by coupling a remote excitation light with an optical signal in a direction opposite to the signal transmission direction. Moreover, forward pumping and backward pumping may be combined.

Moreover, although the amplification connectors 870 are present on both sides of the MC-EDFA 880, signals may be amplified in both directions by one amplification connector 870. For example, remote excitation is performed from the node 550*a* only. The amplification connector 870 on the side of the node 550*a* of the relay node 570 couples a remote excitation light to the core 881 of the MC-EDFA 880. In this case, an optical signal in the first direction is subjected to forward pumping, and an optical signal in the second direction is subjected to backward pumping.

Moreover, when the MC-EDFA 880 and the remote excitation laser 810 are present in the same node, an integrated connector having the functions of both the remote excitation connector 820 and the amplification connector 870 may be used.

Although a case in which the present embodiment is applied to the single-system two-way communication system 100A shown in FIG. 5 has been described, the present embodiment may be applied to the single-system one-way communication system 100 shown in FIG. 1. When the present embodiment is applied to the communication system 100, the optical amplification system 506 may have a configuration of performing optical amplification in any one of the first and second directions.

Fifth Embodiment

In the first to fourth embodiments, a case in which one core of the MCF is used for one-way signal transmission has been described. In this embodiment, a difference from the first to fourth embodiments will be described for a case in which one core of the MCF is used for two-way signal transmission like the communication systems 100C and 100D shown in FIGS. 6 and 7, for example.

In the case of Raman amplification, optical signals are amplified in the core 601 of the MCF 600. Due to this, in the amplification connector 720, it is meaningless to divide optical signals for transmission and reception, and forward pumping and backward pumping are performed simultaneously in the same core 601. That is, the configuration of a connector related to amplification is the same as the case of one-way signal transmission.

When amplification is performed using EDFA and when the MC-EDFA is configured for one-way signal transmission, by dividing signals for transmission and reception, the use can be divided into forward pumping and backward pumping. In this case, the configuration of a connector related to amplification is different from that of the one-way signal transmission.

Moreover, when the MC-EDFA is configured to two-way signal transmission, forward pumping and backward pumping occur in the same core as in the case of Raman amplification. The configuration of a connector related to amplification is the same as the case of one-way signal transmission.

Figure 22:
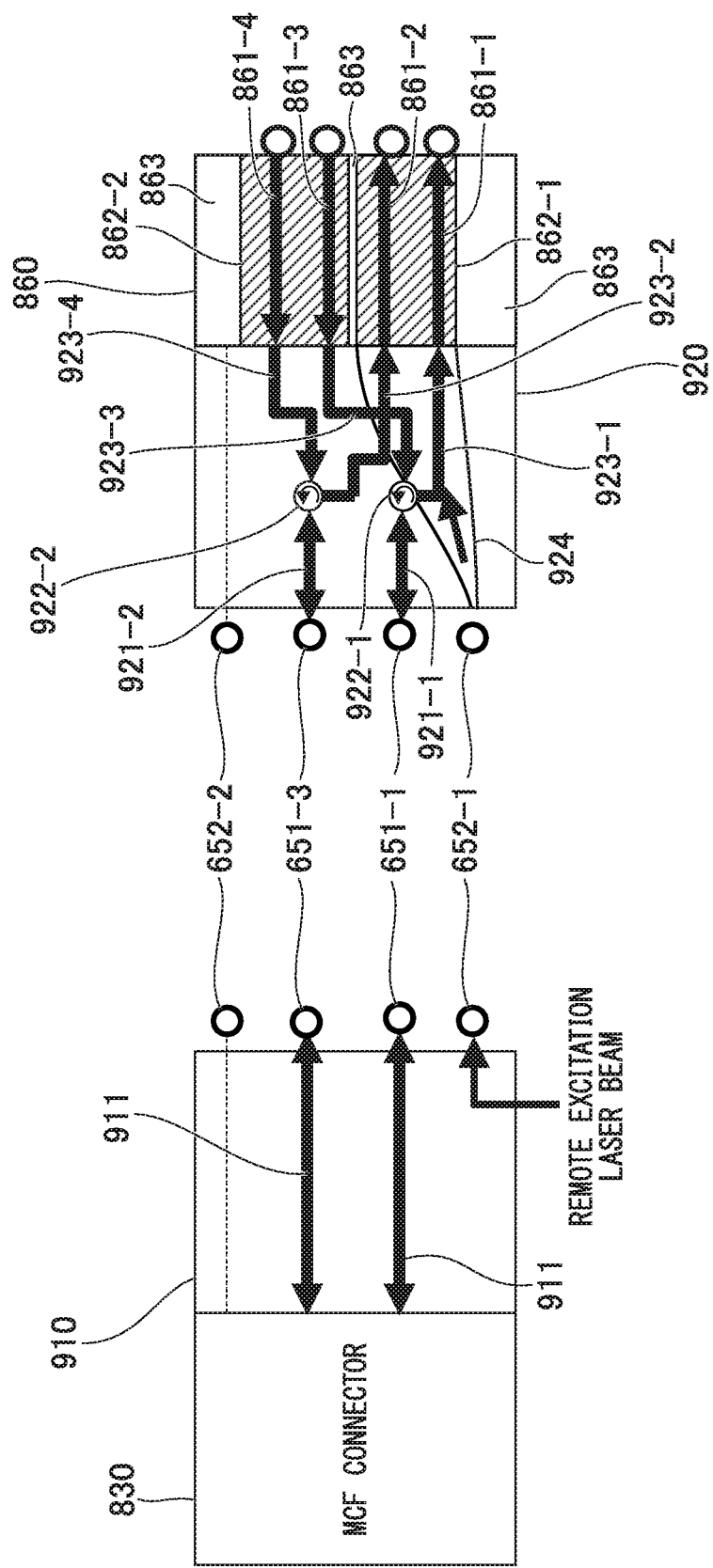
FIG. 22 is a diagram showing a configuration example of a remote excitation connector and an amplification connector according to a fifth embodiment.

FIG. 22 is a diagram showing a configuration example of a remote excitation connector 910 and an amplification connector 920 used when one core of an MCF is used for two-way signal transmission and optical signals of a plurality of cores are amplified collectively by EDFA. The node 550 of the optical amplification system 505 includes a remote excitation connector 910 instead of the remote excitation connector 820. The relay node 560 includes an amplification connector 920 instead of the amplification connector 850. In this example, a case in which the number of signal transmission cores 651 included in the MCF 650 is n=2, and the number of remote excitation cores 652 included in the MCF 650 is m=2 is shown.

The MC-EDFA 860 includes two first cladding portions 862-1 and 862-2. The first cladding portion 862-1 includes n cores 861-1 to 861-$n$ that transmit an optical signal added from the amplification connector 920. The first cladding portion 862-2 includes n cores 861-($n$+i) to 861-2$n$ that transmit an optical signal to be input to the amplification connector 920.

The remote excitation connector 910 has n optical transmission paths 911 that transmit optical signals in two directions. The respective optical transmission paths 911 are connected to the signal transmission cores 651 of the MCF 650. The optical transmission path 911 relays an optical signal input from the signal transmission core 651 to the MCF connector 830 and relays an optical signal input from the MCF connector 830 to the signal transmission core 651. Furthermore, the remote excitation connector 910 inputs the remote excitation laser beam output by the remote excitation laser 810 to the remote excitation core 652 of the MCF 650.

The amplification connector 920 includes n optical transmission paths 921, n circulators 922, 2n optical transmission paths 923, and m or smaller optical transmission paths 924.

The optical transmission paths 921 are connected to respective signal transmission cores 651 of the MCF 650. The n optical transmission paths 921 will be referred to as optical transmission paths 921-1 to 921-$n$. The circulator 922 connected to the optical transmission path 921-$i$ is referred to as a circulator 922-$i$, i being an integer of 1 or more and n or smaller. Moreover, two optical transmission paths 923 connected to the circulator 922-$i$ will be referred to as optical transmission paths 923-$i$ and 923-($n$+1).

The optical transmission path 921-$i$ inputs an optical signal received from the signal transmission core 651-$i$ of the MCF 650 to the circulator 922-$i$ and inputs an optical signal output from the circulator 922-$i$ to the signal transmission core 651-$i$ of the MCF 650.

The circulator 922-$i$ outputs a signal input from the optical transmission path 921-$i$ to the optical transmission path 923-$i$ and outputs a signal input from the optical transmission path 923-($n$+i) to the optical transmission path 921-$i$.

The 2n optical transmission paths 923 are connected to any one of the 2n cores 861 of the MC-EDFA 860. The optical transmission path 923-$i$ inputs an optical signal output from the circulator 922-$i$ to the core 861-$i$ in the first cladding portion 862-1 of the MC-EDFA 860. The optical transmission path 923-($n$+i) adds an optical signal output from the core 861-($n$+i) in the first cladding portion 862-2 of the MC-EDFA 860 to the circulator 922-$i$.

The optical transmission path 924 inputs a remote excitation laser beam transmitted through the remote excitation core 652 of the MCF 650 to partial or all first amplification target cladding portions 862 of the MC-EDFA 860. In the diagram, the optical transmission path 924 inputs the remote excitation laser beam to the first cladding portion 862-1.

Figure 23:
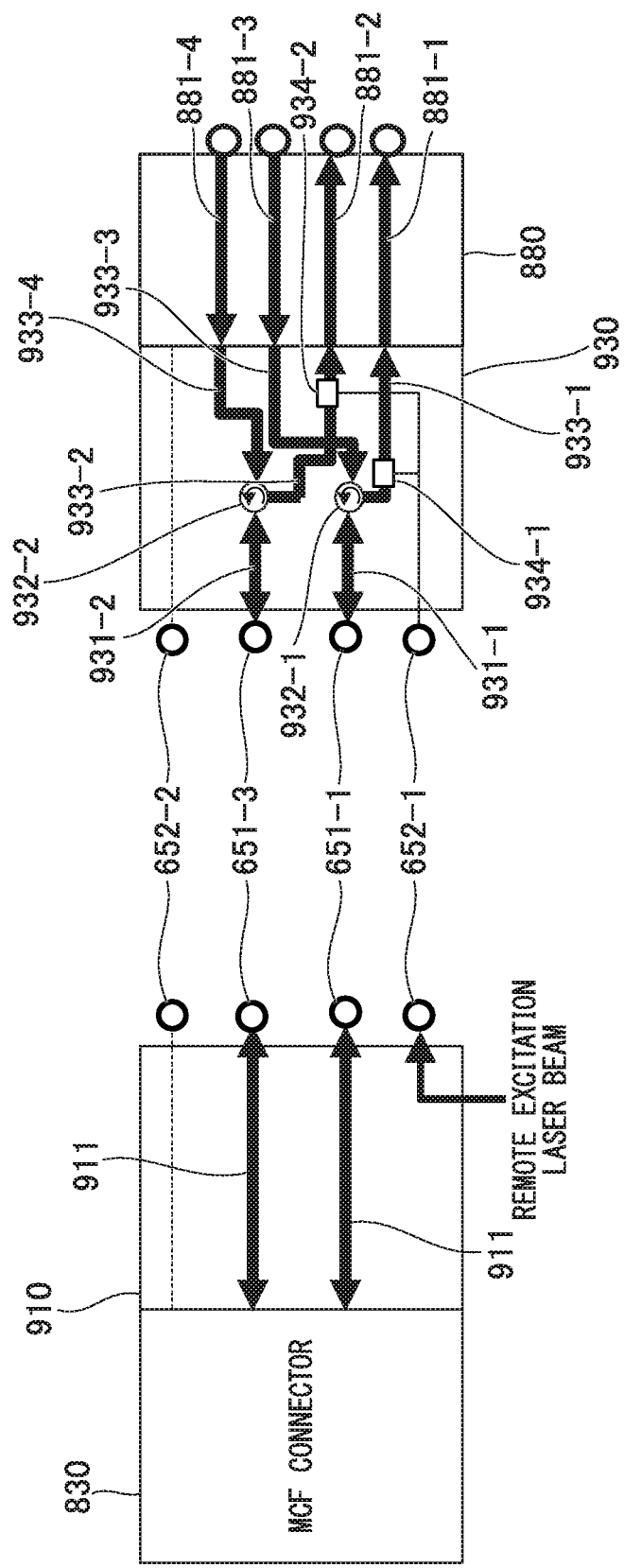
FIG. 23 is a diagram showing a configuration example of an amplification connector according to the fifth embodiment.

FIG. 23 is a diagram showing a configuration example of the amplification connector 930 used when one core of the MCF is used for two-way signal transmission and optical signals of individual cores are amplified by EDFA. The node 550 of the optical amplification system 506 includes the remote excitation connector 910 shown in FIG. 22 instead of the remote excitation connector 820. The relay node 570 includes an amplification connector 930 shown in FIG. 23 instead of the amplification connector 870. In this example, a case in which the number of signal transmission cores 651 included in the MCF 650 is n=2, and the number of remote excitation cores 652 included in the MCF 650 is m=2 is shown.

The MC-EDFA 880 includes 2n cores 881. The n cores 881 that transmit optical signals input from the amplification connector 930 among the 2n cores 881 of the MC-EDFA 880 will be referred to as cores 881-1 to 881-$n$. Moreover, the n cores 881 that transmit optical signals to be input to the amplification connector 930 will be referred to as cores 881-($n$+1) to 881-2$n$.

The amplification connector 930 includes n optical transmission paths 931, n circulators 932, 2n optical transmission paths 933, and k (k is an integer of n or smaller) optical couplers 934. In the diagram, a case in which k=n=2 is shown.

The optical transmission paths 931 are connected to respective signal transmission cores 651 of the MCF 650. The n optical transmission paths 931 will be referred to as optical transmission paths 931-1 to 931-$n$. The circulator 932 connected to the optical transmission path 931-$i$ is referred to as a circulator 932-$i$, i being an integer of 1 or more and n or smaller. Moreover, two optical transmission paths 933 connected to the circulator 932-$i$ will be referred to as optical transmission paths 933-$i$ and 933-($n$+i).

The optical transmission path 931-$i$ inputs an optical signal received from the signal transmission core 651-$i$ of the MCF 650 to the circulator 932-$i$ and inputs an optical signal output from the circulator 932-$i$ to the signal transmission core 651-$i$ of the MCF 650.

The circulator 932-$i$ outputs a signal input from the optical transmission path 931-$i$ to the optical transmission path 933-$i$ and outputs a signal input from the optical transmission path 933-($n$+i) to the optical transmission path 931-$i$.

The 2n optical transmission paths 933 are connected to any one of the 2n cores 881 of the MC-EDFA 880. The optical transmission path 933-$i$ inputs an optical signal output from the circulator 932-$i$ to the core 881-$i$. The optical transmission path 933-($n$+i) inputs an optical signal output from the core 881-($n$+i) of the MC-EDFA 880 to the circulator 932-$i$.

The amplification connector 930 drops the remote excitation laser beam transmitted through the remote excitation core 652 of the MCF 650 and inputs the dropped remote excitation laser beam to the optical couplers 934-1 to 934-$n$. The optical coupler 934-$i$ couples the remote excitation laser beam to the core 881-$i$ of the MC-EDFA 880.

The optical signal transmitted through the cores 881-1 to 881-$n$ of the MC-EDFA 880 is amplified by the remote excitation laser beam coupled by the optical couplers 934-1 to 934-$n$ of the amplification connector 930.

As described above, when the signal transmission core of the MCF transmits optical signals in two directions and the MC-EDFA is for one-way signal transmission, optical signals can be divided in respective directions inside the amplification connector and forward pumping can be performed selectively. When an amplification light is coupled in the direction reverse to the signal transmission direction, backward pumping can be performed similarly.

EDFA may be provided in multiple stages. When an MC-EDFA has a mechanism that passes a remote excitation light to subsequent stages, the MC-EDFA in the subsequent stages performs amplification using a remote excitation light having passed through the MC-EDFA. When a remote excitation light passes through another fiber or the like before reaching the MC-EDFA on the subsequent stage, a mechanism for causing the amplification connector to pass the remote excitation light therethrough is required.

When an MC-EDFA does not have a mechanism for passing a remote excitation light, an amplification connector in an initial stage outputs a remote excitation light outside the amplification connector and the remote excitation light is connected to the amplification connectors in the subsequent stages through another path. In the EDFA on the subsequent stages, amplification is performed using a remote excitation light transmitted through another path.

Although not shown in the drawings, the optical amplification in each of the embodiments may use an isolator that passes light in one direction only and a mechanism or the like that adjusts a power level of an amplification laser appropriately according to a power level of an optical signal. Moreover, although not shown in the drawings, the connectors of the above-described embodiments may be used in an embodiment which includes these mechanisms.

As described above, an optical amplification system according to an embodiment of the present invention includes a plurality of nodes that communicates via a multi-core fiber. The optical amplification system includes an amplification unit that amplifies a communication light transmitted through cores of an MCF using amplification light that the node inputs to the core of the MCF. The amplification unit includes a core of the MCF to which the amplification laser beam is input in the case of the first and second embodiments or includes an amplification connector and an MC-EDFA in the case of the third and fourth embodiment. By the above-described embodiments, optical amplification of the MCF can be performed.

In the third, fourth, and fifth embodiments, an example in which an erbium-doped fiber amplifier is used as an amplification medium has been shown. However, optical amplification may be performed using a fiber amplifier doped with other rare earth elements.

In the first and second embodiments, a configuration in which an optical signal is amplified in the node 510 in which the amplification laser 710 is provided has been described. Without being limited to this, an optical signal may be amplified in a node other than the node 510 in which the amplification laser 710 is provided. For example, an amplification laser beam propagates from the node 510 to another node through a core of the MCF. In another node, an amplification connector drops an amplification laser beam from a core and couples the dropped amplification laser beam to another core. By coupling the amplification laser beam to the other core, an optical signal transmitted through the other core can be amplified in a node other than the node 510. When an amplification laser beam propagates through a plurality of cores, the amplification laser beams are combined in another node, and the combined amplification laser beams are coupled to a core that transmits an optical signal.

When an optical signal is amplified in nodes other than the node 510, the optical signal may be amplified in a plurality of nodes. When an optical signal is amplified in a plurality of nodes, cores that transmit amplification laser beams may be allocated to respective nodes, and the amplification laser beams may propagate through the respective allocated core. Moreover, a core through which the amplification laser beam propagates may be shared by a plurality of nodes. When a core is shared by a plurality of nodes, the nodes split the amplification laser beam dropped from the common core. The nodes amplify an optical signal using one of the split amplification laser beams and adds the other split amplification laser beam to the common core. The ratio of splitting the amplification laser beam may be such a ratio that the amplification laser beam used for amplification is constant in each of the nodes 510 or may be a ratio corresponding to the distance between nodes.

When the amplification laser beam generated in the node 510 is used in other nodes, it is possible to amplify an optical signal even when the amplification laser 710 is not provided in other nodes. Moreover, it is possible to simplify the facility in other nodes.

In the third embodiment, a configuration in which one relay node 560 is provided between the nodes 550 has been described. Without being limited to this configuration, a plurality of relay nodes 560 connected in series may be provided between the nodes 550. When a plurality of relay nodes 560 is provided, the remote excitation cores 652 may be provided for the respective relay nodes 560. In this case, the relay node 560 amplifies an optical signal using a remote excitation laser beam propagating through the remote excitation core 652 allocated to the subject node. One or two or more remote excitation cores 652 may be provided for respective relay nodes 560. When two or more remote excitation cores 652 are allocated to the relay node 560, the relay node 560 combines a plurality of remote excitation laser beams and amplifies an optical signal using the combined remote excitation laser beam.

When a plurality of relay nodes 560 is provided, the plurality of relay nodes 560 may share the remote excitation core 652. In this case, the relay node 560 splits the remote excitation laser beam propagating through the remote excitation core 652 into two beams using an optical splitter. The relay node 560 amplifies an optical signal using one of the split remote excitation laser beams and adds the other split remote excitation laser beam to the remote excitation core 652. The other split remote excitation laser beam is supplied to an adjacent relay node 560 through the remote excitation core 652. One or two or more remote excitation cores 652 may be shared by the plurality of relay nodes 560. The ratio of splitting the remote excitation laser beam may be a ratio such that the remote excitation laser beam used for amplification is constant in respective relay nodes 560 or may be a ratio corresponding to the distance between nodes.

When two or more remote excitation cores 652 are shared, the relay node 560 splits the remote excitation laser beams propagating through all or partial remote excitation cores 652. The relay node 560 combines one set of split remote excitation laser beams and amplifies an optical signal using the combined remote excitation laser beam. The relay node 560 adds the other set of split remote excitation laser beams to a plurality of remote excitation cores 652. The order of splitting and combining may be reversed. In the optical amplification systems of the fourth and fifth embodiments, similarly, a plurality of relay nodes 570 connected in series may be provided between the nodes 550 without being limited to this configuration.

When a plurality of relay nodes 560 is provided between the nodes 550, it is easy to increase the transmission distance of an optical signal as compared to a case in which one relay node 560 is provided.

In the respective embodiments described above, a configuration example in which an MCF is used for connection between nodes has been described. Without being limited to the configuration described in the embodiments, a SCF may be used between nodes as shown in FIGS. 9 and 10. When a SCF is used for connection between nodes in the optical amplification systems of the third, fourth, and fifth embodiments, although a remote excitation laser beam propagates through the SCF similarly to an optical signal, the optical signal can be amplified using the configuration described in the respective embodiments. When a SCF is used for connection between nodes in the optical amplification systems of the first and second embodiments, it is necessary to avoid switching between SCF and MCF in a segment in which an optical signal is amplified. When switching between SCF and MCF is performed by a conversion connector in segments other than the segment in which an optical signal is amplified, it is possible to amplify an optical signal using the configuration described in the first and second embodiments even when SCF is used for connection between nodes.

While embodiments of the present invention have been described with reference to the drawings, a specific structure is not limited to the embodiments but the present invention embraces design modifications made without departing from the spirit of the present invention.

INDUSTRIAL APPLICABILITY

The present invention is applicable to a system that transmits signals between nodes using a multi-core fiber.

REFERENCE SIGNS LIST 100, 100A, 100C, 100D Communication system
110, 110a, 110b Transceiving node
111-1 to 111-6 Transmitting device
112-1 to 112-6 Receiving device
113-1 to 113-6 Transceiving device
120, 120-1 to 120-3 Add/Drop node
121-1 to 121-3 Transmitting device
122-1 to 122-3 Receiving device
125-1 to 125-3 Transceiving device
126-1 to 126-3 Transceiving device
150, 150-1 to 150-3 Connector
160-1 to 160-4 Connector
180-1 to 180-3 Connector
185-1 to 185-3 Connector
200-1 to 200-4, 200-21, 200-22 MCF (multi-core fiber)
201, 201-1 to 201-4, 201-21, 201-22 Core
202, 202-1 to 202-4, 202-21, 202-22 Core
203, 203-1 to 203-4, 203-21, 203-22 Core
210-1 to 210-4 MCF (multi-core fiber)
211, 211-1 to 211-4 Core
212, 212-1 to 212-4 Core
213, 213-1 to 213-4 Core
214, 214-1 to 214-4 Core
215, 215-1 to 215-4 Core
216, 216-1 to 216-4 Core
400-1, 400-2, 410-1, 410-2 Conversion connector
451, 452, 453 SCF (single-core fiber)
500, 501, 505, 506 Optical amplification system
510a, 510b, 510c, 550a, 550b Node
560, 570 Relay node
600, 600-1 to 600-3, 650, 650-1 to 650-4 MCF (multi-core fiber)
601, 601-1 to 601-4 Core
651, 651-1 to 651-4 Signal transmission core
652, 652-1 to 652-2 Remote excitation core
710, 710a, 710b Amplification laser
720, 720a-1, 720a-2, 720b-1, 720b-2 Amplification connector
721 Optical transmission path
722 Optical coupler
730, 730a, 730b, 730c MCF connector
810, 810a, 810b Remote excitation laser
820, 820a-1, 820a-2, 820b-1, 820b-2 Remote excitation connector
821, 821-1 to 821-4 Optical transmission path
830, 830a, 830b MCF connector
850, 850-1 to 850-2 Amplification connector
851, 851-1 to 851-4 Optical transmission path
852 Optical transmission path
860, 880 MC-EDFA
861, 861-1 to 861-4, 881, 881-1 to 881-4 Core
862, 862-1 to 862-2 First cladding portion
863 Second cladding portion
870, 870-1 to 870-2 Amplification connector
871, 871-1 to 871-4 Optical transmission path
872, 872-1 to 872-2 Optical coupler
910 Remote excitation node
911 Optical transmission path
920 Amplification connector
921-1 to 921-2 Optical transmission path
922-1 to 922-2 Circulator
923-1 to 923-4 Optical transmission path
924 Optical transmission path
930 Amplification connector
931-1 to 931-4 Optical transmission path
932-1 to 932-2 Circulator
933-1 to 933-4 Optical transmission path
934-1 to 934-2 Optical coupler

The invention claimed is:

1. An optical amplification system comprising:
three or more nodes;
a multi-core fiber having a plurality of cores, the multi-core fiber being used in at least a partial segment of the connection between the nodes;
an amplification light input unit configured to input amplification light to a core of the plurality of cores of the multi-core fiber;
an amplification unit configured to amplify communication light transmitted through at least one core of the plurality of cores of the multi-core fiber using the amplification light, the amplification unit being provided in the nodes or between the nodes; and
an amplification light coupling unit configured to couple the amplification light input by the amplification light input unit to the amplification unit,
wherein
the amplification unit provided in the nodes amplifies the communication light using the amplification light which is generated in another node of the nodes and is transmitted through one of the plurality of cores of the multi-core fiber.

2. The optical amplification system according to claim 1, wherein
the amplification unit includes the at least one core transmitting the communication light among the plurality of cores of the multi-core fiber.

3. The optical amplification system according to claim 1, wherein
the amplification unit includes a multi-core fiber amplifier doped with a rare earth element.

4. The optical amplification system according to claim 3, wherein
the amplification unit includes an erbium-doped multi-core fiber amplifier.

5. The optical amplification system according to claim 1, wherein
the one of the plurality of cores of the multi-core fiber transmitting the amplification light is different from the at least one core of the plurality of cores of the multi-core fiber transmitting the communication light.

6. The optical amplification system according to claim 1, wherein
the one of the plurality of cores of the multi-core fiber transmitting the amplification light is the same as the at least one core of the plurality of cores of the multi-core fiber transmitting the communication light.

7. An optical amplification method executed by an optical amplification system which includes three or more nodes and a multi-core fiber having a plurality of cores, the multi-core fiber being used in at least a partial segment of the connection between the nodes, the optical amplification method comprising:
an amplified light input step of inputting, by an amplification light input unit, amplification light to a core of the multi-core fiber;
an amplification light coupling step of coupling, by an amplification light coupling unit, the amplification light input in the amplification light input step to an amplification unit provided in the nodes or between the nodes; and
an amplification step of amplifying, by the amplification unit, communication light transmitted through at least one of the plurality of cores of the multi-core fiber using the amplification light,
wherein
in the amplification step, the amplification unit provided in the nodes amplifies the communication light using the amplification light which is generated in another node of the nodes and is transmitted through one of the plurality of cores of the multi-core fiber.

8. An optical amplification system comprising:
three or more nodes;
a multi-core fiber having a plurality of cores, the multi-core fiber being used in at least a partial segment of the connection between the nodes;
a connector configured to input amplification light to a core of the plurality of cores of the multi-core fiber;
an amplifier configured to amplify communication light transmitted through at least one core of the plurality of cores of the multi-core fiber using the amplification light, the amplifier being provided in the nodes or between the nodes; and
an optical coupler configured to couple the amplification light input by the connector to the amplifier,
wherein
the amplifier provided in the nodes amplifies the communication light using the amplification light which is generated in another node of the nodes and is transmitted through one of the plurality of cores of the multi-core fiber.

* * * * *